United States Patent
Jain et al.

(10) Patent No.: US 11,694,317 B1
(45) Date of Patent: *Jul. 4, 2023

(54) MACHINE VISION SYSTEM AND INTERACTIVE GRAPHICAL USER INTERFACES RELATED THERETO

(71) Applicant: Samsara Inc., San Francisco, CA (US)

(72) Inventors: Anubhav Jain, Lexington, MA (US); John Bicket, Burlingame, CA (US); Yu Kang Chen, San Francisco, CA (US); Arthur Pohsiang Huang, San Francisco, CA (US); Adam Eric Funkenbusch, Saint Paul, MN (US); Sanjit Zubin Biswas, San Francisco, CA (US); Benjamin Arthur Calderon, San Francisco, CA (US); Andrew William Deagon, San Francisco, CA (US); William Waldman, San Francisco, CA (US); Noah Paul Gonzales, Sebastopol, CA (US); Ruben Vardanyan, Daly City, CA (US); Somasundara Pandian, San Francisco, CA (US); Ye-Sheng Kuo, San Jose, CA (US); Siri Amrit Ramos, San Francisco, CA (US)

(73) Assignee: Samsara Inc., San Francisco, CA (US)

( * ) Notice: Subject to any disclaimer, the term of this patent is extended or adjusted under 35 U.S.C. 154(b) by 154 days.

This patent is subject to a terminal disclaimer.

(21) Appl. No.: 17/445,805

(22) Filed: Aug. 24, 2021

Related U.S. Application Data

(63) Continuation of application No. 16/567,616, filed on Sep. 11, 2019, now Pat. No. 11,127,130.

(Continued)

(51) Int. Cl.
*G06T 7/00* (2017.01)
*G06T 1/00* (2006.01)
*G06V 10/44* (2022.01)

(52) U.S. Cl.
CPC .......... *G06T 7/0002* (2013.01); *G06T 1/0007* (2013.01); *G06T 1/0014* (2013.01); *G06V 10/44* (2022.01)

(58) Field of Classification Search
CPC ... G06T 7/0002; G06T 1/0007; G06T 1/0014; G06V 10/44
See application file for complete search history.

(56) References Cited

U.S. PATENT DOCUMENTS

| 6,157,864 A | 12/2000 | Schwenke et al. |
| 6,801,920 B1 | 10/2004 | Wischinski |

(Continued)

OTHER PUBLICATIONS

Elias N. Malamas et al. "A survey on industrial vision systems, applications and tools", Sep. 17, 2002, Image and Vision Computing 21, pp. 171-188.

*Primary Examiner* — Ping Y Hsieh
(74) *Attorney, Agent, or Firm* — Knobbe, Martens, Olson & Bear, LLP

(57) ABSTRACT

Machine vision devices may be configured to automatically connect to a remote management server (e.g., a "cloud"-based management server), and may offload and/or communicate images and analyses to the remote management server via wired or wireless communications. The machine vision devices may further communicate with the management server, user computing devices, and/or human machine interface devices, e.g., to provide remote access to the machine vision device, provide real-time information from the machine vision device, receive configurations/updates, provide interactive graphical user interfaces, and/or the like.

20 Claims, 25 Drawing Sheets

Related U.S. Application Data

(60) Provisional application No. 62/831,340, filed on Apr. 9, 2019.

(56) References Cited

U.S. PATENT DOCUMENTS

| | | |
|---|---|---|
| 7,596,417 B2 | 9/2009 | Fister et al. |
| 7,957,936 B2 | 6/2011 | Eryurek et al. |
| 9,230,250 B1 | 1/2016 | Parker et al. |
| 9,445,270 B1 | 9/2016 | Bicket et al. |
| 9,779,296 B1 * | 10/2017 | Ma ............... G06T 7/11 |
| 10,033,706 B2 | 7/2018 | Bicket et al. |
| 10,085,149 B2 | 9/2018 | Bicket et al. |
| 10,102,495 B1 | 10/2018 | Zhang et al. |
| 10,173,486 B1 | 1/2019 | Lee et al. |
| 10,196,071 B1 | 2/2019 | Rowson et al. |
| 10,206,107 B2 | 2/2019 | Bicket et al. |
| 10,388,075 B2 | 8/2019 | Schmirler et al. |
| 10,390,227 B2 | 8/2019 | Bicket et al. |
| 10,444,949 B2 | 10/2019 | Scott et al. |
| 10,579,123 B2 | 3/2020 | Tuan et al. |
| 10,609,114 B1 | 3/2020 | Bicket et al. |
| 10,678,849 B1 * | 6/2020 | Ouimet ............... G06V 10/82 |
| 10,827,324 B1 | 11/2020 | Hajimiri et al. |
| 10,843,659 B1 | 11/2020 | Innocenzi et al. |
| 11,046,205 B1 | 6/2021 | Govan et al. |
| 11,122,488 B1 | 9/2021 | Lloyd et al. |
| 11,126,910 B1 | 9/2021 | Akhtar et al. |
| 11,128,130 B2 | 9/2021 | Jain et al. |
| 11,131,986 B1 | 9/2021 | Gal et al. |
| 11,132,853 B1 | 9/2021 | Akhtar et al. |
| 11,137,744 B1 | 10/2021 | Heddleston et al. |
| 11,158,177 B1 | 10/2021 | ElHattab et al. |
| 11,184,422 B1 | 11/2021 | Bicket et al. |
| 11,188,046 B1 | 11/2021 | ElHattab et al. |
| 11,190,373 B1 | 11/2021 | Stevenson et al. |
| 2002/0169850 A1 | 11/2002 | Batke et al. |
| 2013/0211559 A1 | 8/2013 | Lawson et al. |
| 2014/0328517 A1 * | 11/2014 | Gluncic ............... A61B 6/5211 382/103 |
| 2014/0337429 A1 | 11/2014 | Asenjo et al. |
| 2015/0077325 A1 * | 3/2015 | Ferens ............... G06F 3/011 345/156 |
| 2017/0060726 A1 | 3/2017 | Glistvain |
| 2017/0123397 A1 | 5/2017 | Billi et al. |
| 2017/0195265 A1 | 7/2017 | Billi et al. |
| 2017/0278004 A1 | 9/2017 | McElhinney et al. |
| 2018/0234514 A1 | 8/2018 | Rajiv et al. |
| 2018/0356800 A1 | 12/2018 | Chao et al. |
| 2018/0364686 A1 | 12/2018 | Naidoo et al. |
| 2019/0327613 A1 | 10/2019 | Bicket et al. |
| 2020/0105009 A1 * | 4/2020 | Eno ............... G06T 7/70 |
| 2020/0150739 A1 | 5/2020 | Tuan et al. |
| 2020/0342230 A1 | 10/2020 | Tsai et al. |
| 2020/0342235 A1 | 10/2020 | Tsai et al. |
| 2020/0342274 A1 | 10/2020 | ElHattab et al. |
| 2020/0342611 A1 | 10/2020 | ElHattab et al. |
| 2020/0344301 A1 | 10/2020 | ElHattab et al. |
| 2021/0006950 A1 | 1/2021 | Hajimiri et al. |

* cited by examiner

VISION ALERTS SETTINGS SUPPORT

General
Name: Country Style Chef Salad

Time Zone: 0 ▽

Actions / Outputs
Trigger output based on:
- ☐ 1 consecutive REJECTED
- ☐ 1 consecutive NO READS
- ☐ 1 consecutive PASSES Output Type: Pulse ▽
Delay(ms): 0
Pulse Duration(ms): 0

▷ Updated program | Chef Salad

Camera Inspection Trigger

RESULTS PER STEP — 1150

| Name | ✓ | ? | ✗ |
|---|---|---|---|
| Fixture | 0 | 0 | 0 |
| Barcode | 0 | 0 | 0 |
| Text Match | 0 | 0 | 0 |

Trigger or capture an image to see results ▼

View inspection results

🗎 Capture — 1151

Done

FIG. 11F

MACHINE VISION SYSTEM AND INTERACTIVE GRAPHICAL USER INTERFACES RELATED THERETO

CROSS-REFERENCE TO RELATED APPLICATIONS

This application is a continuation of U.S. patent application Ser. No. 16/567,616, filed Sep. 11, 2019, and titled "MACHINE VISION SYSTEM AND INTERACTIVE GRAPHICAL USER INTERFACES RELATED THERETO," which application claims benefit of U.S. Provisional Patent Application No. 62/831,340, filed Apr. 9, 2019, and titled "MACHINE VISION SYSTEM AND INTERACTIVE GRAPHICAL USER INTERFACES RELATED THERETO." The entire disclosure of each of the above items is hereby made part of this specification as if set forth fully herein and incorporated by reference for all purposes, for all that it contains.

Any and all applications for which a foreign or domestic priority claim is identified in the Application Data Sheet as filed with the present application are hereby incorporated by reference under 37 CFR 1.57 for all purposes and for all that they contain.

TECHNICAL FIELD

Embodiments of the present disclosure relate to machine vision devices, sensors, systems, and methods that allow for image acquisition and processing. Embodiments of the present disclosure further relate to devices, systems, and methods that provide interactive graphical user interfaces for interfacing with and configuring machine vision devices, sensors, and systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Machine vision systems (sometimes also referred to as "smart cameras" or the like) may be used for a variety of manufacturing and inspection processes in research and industry. A machine vision system enables monitoring of subject parts and workpieces, either at stationary locations or on moving lines, and comparison of acquired images of the subjects to trained patterns, and/or analysis of acquired images by analysis algorithms. Machine vision systems generally employ a camera with an image-acquisition sensor. The sensor, e.g., may be based upon a charge-coupled device (CCD) or CMOS element. Machine vision is used to accomplish a number of different industrial, commercial, and governmental tasks. For example, machine vision can be employed to decode symbology, such as barcodes and two-dimensional data matrices (e.g., QR codes, etc.). Machine vision can also be employed to scan for defects in a part or surface, detect missing articles, detect article characteristics (e.g., position, etc.), and the like. Where a defect, characteristic, or missing article is detected, the machine vision system can signal an alarm and/or stop a conveyor line. The machine vision system may operate based upon a trigger signal, provided by another opto-electric presence sensor or break beam, or based upon the timing of the moving line, which is signaled by (for example) an encoder. The machine vision system may also cause a rejection device (a "part kicker") to eject a given article from the line.

In general, configuration of machine vision systems can be time consuming, and unfriendly or impossible for non-technical users. For example, configuration of individual machine vision devices may require manual interaction with the individual devices, updating firmware (e.g., by inserting memory devices or wired computer interfaces at the individual machine vision devices) or adjusting settings. Further, in general, gathering data from individual machine vision devices can be time-consuming and laborious, rendering impossible any real-time or near real-time analyses of such data, including any analyses of data from multiple machine vision devices. These limitations can make it particularly difficult (or impossible for non-technical users) to deal with situations where a machine vision device begins to fail (e.g., begins to fail providing accurate detections, e.g., due to timing errors and/or the like), or needs to be updated in view of changes, e.g., to a manufacturing line or process.

SUMMARY

The systems, methods, and devices described herein each have several aspects, no single one of which is solely responsible for its desirable attributes. Without limiting the scope of this disclosure, several non-limiting features will now be described briefly.

Embodiments of the present disclosure relate to machine vision devices, sensors, systems, and methods that allow for image acquisition and processing. Embodiments of the present disclosure further relate to devices, systems, and methods that provide interactive graphical user interfaces for interfacing with and configuring machine vision devices, sensors, and systems.

For example, according to various embodiments, the present disclosure includes one or more machine vision devices that include at least an image sensor for acquiring image data, e.g., associated with a manufacturing line or process. The image data may be processed or analyzed by the machine vision device, based on a configuration of the machine vision device, e.g., to detect features, defects, characteristics, position, etc. associated with articles in the manufacturing line or process. The machine vision device may provide outputs in response to image analysis, e.g., to stop the manufacturing line or process, reject articles, cause sending of alerts, etc. The machine vision device may include on-device memory for storing images and analyses. The machine vision device may further include aspects, including one or more web-servers, for communicating with other devices/systems.

In various embodiments, the machine vision devices may be configured to automatically connect to a remote management server (e.g., a "cloud"-based management server), and may offload images and analyses to the remote management server via wired or wireless communications. The machine vision devices may further communicate with the management server, user computing devices, and/or human machine interface devices, e.g., to provide remote access to the machine vision device, provide real-time information from the machine vision device, receive configurations/updates, provide interactive graphical user interfaces, and/or the like.

In various embodiments, the management server may aggregate images and/or analysis data from one or more machine vision devices, and provide statuses, alerts, analyses, etc., including via interactive graphical user interfaces that may be accessed via user computing devices. The management server may provide interactive graphical user interfaces through which a user may configure one or more machine vision devices.

In various embodiments, human machine interface ("HMI") devices may communicate with the machine vision devices (and/or other systems, devices, etc.), e.g., via accessing web-servers running on the machine vision devices that provide interactive graphical user interfaces to the human machine interface devices. Users may thereby configure and/or monitor status of the machine vision devices via the human machine interface devices. Typically, the human machine interface devices may communicate with the machine vision devices via a local network (e.g., a network local to, or on-site at, a particular organization).

In various embodiments, the machine vision devices and/or HMI devices may communicate with various additional devices, e.g., various components of a manufacturing line or process, sensors, etc. Such communications may be accomplished via one or more application programming interfaces ("APIs").

Advantageously, various embodiments of the present disclosure may overcome various disadvantages of prior systems and methods. For example, embodiments of the present disclosure may include machine vision devices that include built-in wireless and/or wired communications capabilities. The machine vision devices may automatically establish communication with a remote management server, HMI devices, PLCs, gateways, and/or the like. The machine vision devices may be remotely and centrally monitored and configured via the management server, e.g., via an interactive graphical user interface accessible from a user computing device. The machine vision devices may include onboard image data processing/analysis capabilities such that they may operate autonomously based on a current configuration. However, the machine vision devices may further include automatic offloading and/or communicating of image and analysis data to a remote database (e.g., via the management server). Such image and analysis data may be useable by the management server for providing further analyses, insights, alerts, summaries, etc. to users via interactive graphical user interfaces. The machine vision devices may provide remote access to live image data and analyses via a web-server operating on the machine vision devices. Human machine interface devices may communicate with the machine vision devices via wired or wireless, direct or networked communications. The machine vision devices may provide interactive graphical user interfaces to such human machine interface devices, enabling synchronization of machine vision device status at multiple human machine interface devices and/or other user devices.

Advantageously, according to various embodiments, the present disclosure may provide an easy-to-deploy, easy-to-monitor quality management system that makes automated product inspection affordable and fast to deploy across many production lines. The present disclosure may combine built-in connectivity and automated traceability reporting with advanced image processing capability to reduce defects and make previously complex inspection challenges affordable. Further, present disclosure may provide centrally managed and deployed verification programs that reduce downtime and line setup, while out-of-the-box traceability reporting and defect (and/or other characteristic) alerting may increase operational compliance, productivity, and quality.

Accordingly, in various embodiments, large amounts of data may be automatically and dynamically gathered and analyzed in response to user inputs and configurations, and the analyzed data may be efficiently presented to users. Thus, in some embodiments, the systems, devices, configuration capabilities, graphical user interfaces, and the like described herein are more efficient as compared to previous systems, etc.

Further, as described herein, according to various embodiments systems and or devices may be configured and/or designed to generate graphical user interface data useable for rendering the various interactive graphical user interfaces described. The graphical user interface data may be used by various devices, systems, and/or software programs (for example, a browser program), to render the interactive graphical user interfaces. The interactive graphical user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The present disclosure describes various embodiments of interactive and dynamic graphical user interfaces that are the result of significant development. This non-trivial development has resulted in the graphical user interfaces described herein which may provide significant cognitive and ergonomic efficiencies and advantages over previous systems. The interactive and dynamic graphical user interfaces include improved human-computer interactions that may provide reduced mental workloads, improved decision-making, improved capabilities, reduced work stress, and/or the like, for a user. For example, user interaction with the interactive graphical user interface via the inputs described herein may provide an optimized display of, and interaction with, machine vision devices, and may enable a user to more quickly and accurately access, navigate, assess, and digest analyses, configurations, image data, and/or the like, than previous systems.

Further, the interactive and dynamic graphical user interfaces described herein are enabled by innovations in efficient interactions between the user interfaces and underlying systems and components. For example, disclosed herein are improved methods of receiving user inputs (including methods of interacting with, and selecting, images), translation and delivery of those inputs to various system components (e.g., machine vision devices), automatic and dynamic execution of complex processes in response to the input delivery (e.g., execution of configurations on machine vision devices), automatic interaction among various components and processes of the system, and automatic and dynamic updating of the user interfaces (to, for example, display the information related to machine vision devices). The interactions and presentation of data via the interactive graphical user interfaces described herein may accordingly provide cognitive and ergonomic efficiencies and advantages over previous systems.

Various embodiments of the present disclosure provide improvements to various technologies and technological fields, and practical applications of various technological features and advancements. For example, as described above, existing machine vision systems are limited in various ways, and various embodiments of the present disclosure provide significant improvements over such technology, and practical applications of such improvements. Additionally, various embodiments of the present disclosure are inextricably tied to, and provide practical applications of, computer technology. In particular, various embodiments rely on detection of user inputs via graphical user interfaces, operation and configuration of machine vision devices, calculation of updates to displayed electronic data based on user inputs, automatic processing of image data, and presentation of updates to displayed images and analyses via interactive graphical user interfaces. Such features and others are intimately tied to, and enabled by, computer and machine vision technology, and would not exist except for computer and machine vision technology. For example, the machine vision functionality and interactions with displayed data described below in reference to various embodiments cannot reasonably be performed by humans alone, without the computer and imaging technology upon which they are implemented. Further, the implementation of the various embodiments of the present disclosure via computer technology enables many of the advantages described herein, including more efficient interaction with, and presentation and analysis of, various types of electronic image data, machine vision device operation and configuration, and the like.

Various combinations of the above and below recited features, embodiments, and aspects are also disclosed and contemplated by the present disclosure.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIGS. 11A-11H illustrate example interactive graphical user interfaces related to machine vision device configuration, according to various embodiments of the present disclosure.

DETAILED DESCRIPTION

Figure 1:
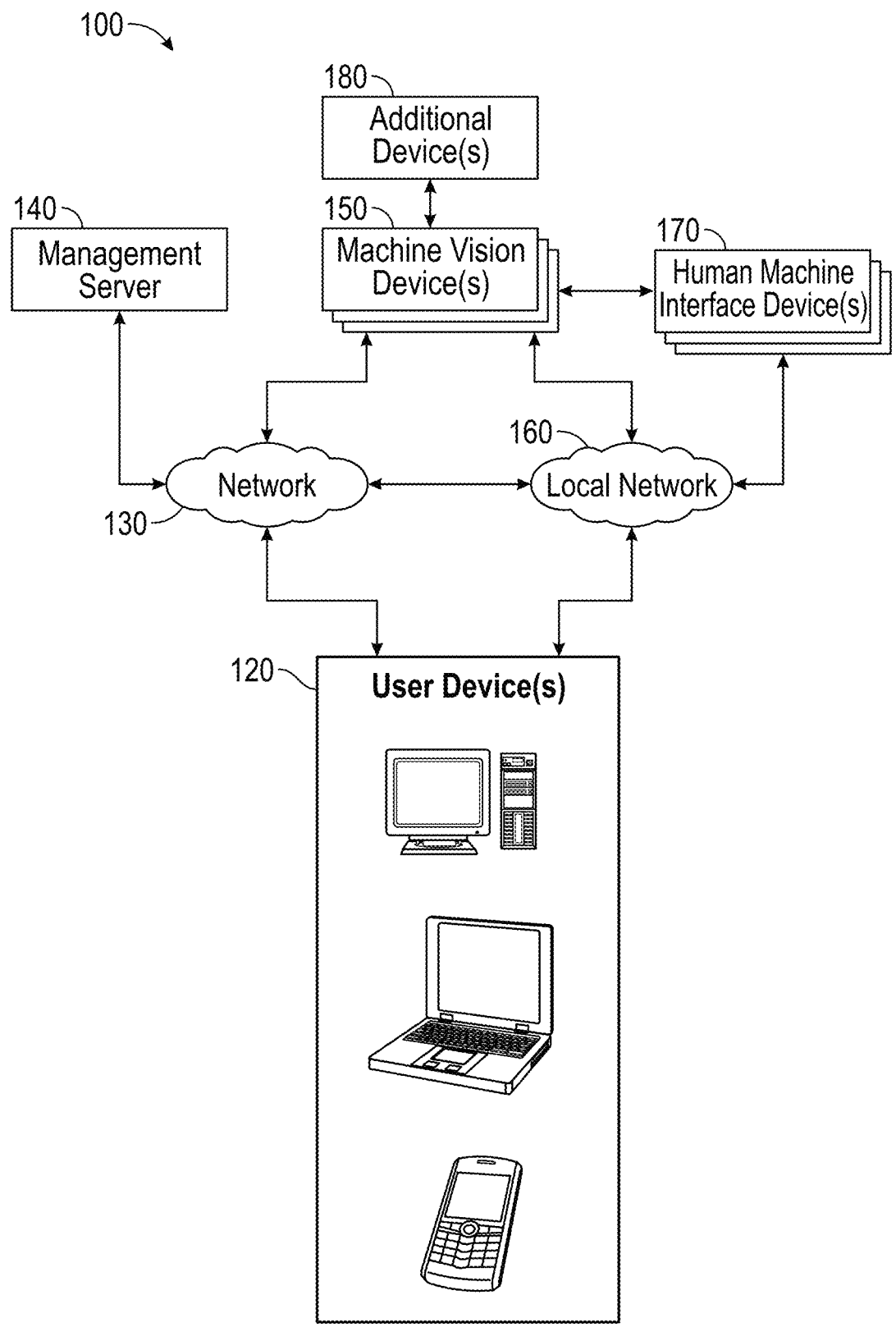
FIG. 1 illustrates a block diagram of an example operating environment 100 in which one or more aspects of the present disclosure may operate, according to various embodiments of the present disclosure.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

I. Overview

As mentioned above, according to various embodiments, the present disclosure includes one or more machine vision devices that include at least an image sensor for acquiring image data, e.g., associated with a manufacturing line or process. The image data may be processed or analyzed by the machine vision device, based on a configuration of the machine vision device, e.g., to detect features, defects, characteristics, position, etc. associated with articles in the manufacturing line or process. The machine vision device may provide outputs in response to image analysis, e.g., to stop the manufacturing line or process, reject articles, cause sending of alerts, etc. The machine vision device may include on-device memory for storing images and analyses. The machine vision device may further include components for communicating with other devices/systems, including one or more web-servers.

In various embodiments, the machine vision devices may be configured to automatically connect to a remote management server (e.g., a "cloud"-based management server), and may offload images and analyses to the remote management server via wired or wireless communications. The machine vision devices may further communicate with the management server, user computing devices, and/or human machine interface devices, e.g., to provide remote access to the machine vision device, provide real-time information from the machine vision device, receive configurations/updates, provide interactive graphical user interfaces, and/or the like.

In various embodiments, the management server may aggregate images and/or analysis data from one or more machine vision devices, and provide statuses, alerts, analyses, etc., including via interactive graphical user interfaces that may be accessed via user computing devices. The management server may provide interactive graphical user interfaces through which a user may configure one or more machine vision devices.

In various embodiments, human machine interface ("HMI") devices may communicate with the machine vision devices (and/or other systems, devices, etc.), e.g., via accessing web-servers running on the machine vision devices that provide interactive graphical user interfaces to the human machine interface devices. Users may thereby configure and/or monitor status of the machine vision devices via the human machine interface devices. Typically, the human machine interface devices may communicate with the machine vision devices via a local network (e.g., a network local to, or on-site at, a particular organization).

In various embodiments, the machine vision devices and/or HMI devices may communicate with various additional devices, e.g., various components of a manufacturing line or process, sensors, etc. Such communications may be accomplished via one or more application programming interfaces ("APIs").

Various aspects of the present disclosure may individually and/or collectively provide various technical advantages as described herein, and may overcome various disadvantages of prior systems and methods. For example, embodiments of the present disclosure may include machine vision devices that include built-in wireless and/or wired communications capabilities. The machine vision devices may automatically establish communication with a remote management server, HMI devices, PLCs, gateways, and/or the like. The machine vision devices may be remotely and centrally monitored and configured via the management server, e.g., via an interactive graphical user interface accessible from a user computing device. The machine vision devices may include on-board image data processing/analysis capabilities such that they may operate autonomously based on a current configuration. However, the machine vision devices may further include automatic offloading and/or communicating of image and analysis data to a remote database (e.g., via the management server). Such image and analysis data may be useable by the management server for providing further analyses, insights, alerts, summaries, etc. to users via interactive graphical user interfaces. The machine vision devices may provide remote access to live image data and analyses via a web-server operating on the machine vision devices. Human machine interface devices may communicate with the machine vision devices via wired or wireless, direct or networked communications. The machine vision devices may provide interactive graphical user interfaces to such human machine interface devices, enabling synchronization of machine vision device status at multiple human machine interface devices and/or other user devices.

Advantageously, according to various embodiments, the present disclosure may provide an easy-to-deploy, easy-to-monitor quality management system that makes automated product inspection affordable and fast to deploy across many production lines. The present disclosure may combine built-in connectivity and automated traceability reporting with advanced image processing capability to reduce defects and make previously complex inspection challenges affordable. Further, present disclosure may provide centrally managed and deployed verification programs that reduce downtime and line setup, while out-of-the-box traceability reporting and defect (and/or other characteristic) alerting may increase operational compliance, productivity, and quality.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

II. Terms

In order to facilitate an understanding of the systems and methods discussed herein, a number of terms are defined below. The terms defined below, as well as other terms used herein, should be construed broadly to include the provided definitions, the ordinary and customary meaning of the terms, and/or any other implied meaning for the respective terms. Thus, the definitions below do not limit the meaning of these terms, but only provide example definitions.

User Input (also referred to as "Input"): Any interaction, data, indication, etc., received by a system/device from a user, a representative of a user, an entity associated with a user, and/or any other entity. Inputs may include any interactions that are intended to be received and/or stored by the system/device; to cause the system/device to access and/or store data items; to cause the system to analyze, integrate, and/or otherwise use data items; to cause the system to update to data that is displayed; to cause the system to update a way that data is displayed; and/or the like. Non-limiting examples of user inputs include keyboard inputs, mouse inputs, digital pen inputs, voice inputs, finger touch inputs (e.g., via touch sensitive display), gesture inputs (e.g., hand movements, finger movements, arm movements, movements of any other appendage, and/or body movements), and/or the like. Additionally, user inputs to the system may include inputs via tools and/or other objects manipulated by the user. For example, the user may move an object, such as a tool, stylus, or wand, to provide inputs. Further, user inputs may include motion, position, rotation, angle, alignment, orientation, configuration (e.g., fist, hand flat, one finger extended, etc.), and/or the like. For example, user inputs may comprise a position, orientation, and/or motion of a hand or other appendage, a body, a 3D mouse, and/or the like.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, PostgreSQL databases, etc.), non-relational databases (e.g., NoSQL databases, etc.), in-memory databases, spreadsheets, comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores. Additionally, although the present disclosure may show or describe data as being stored in combined or separate databases, in various embodiments such data may be combined and/or separated in any appropriate way into one or more databases, one or more tables of one or more databases, etc. As used herein, a data source may refer to a table in a relational database, for example.

III. Example Operating Environment

FIG. 1 illustrates a block diagram of an example operating environment 100 in which one or more aspects of the present disclosure may operate, according to various embodiments of the present disclosure. The operating environment 100 may include one or more user devices 120, a management server 140, machine vision device 150, one or more human machine interface devices 170, and one or more additional devices 180. The various devices may communicate with one another via, e.g., a communications network 130 and/or a local communications network 160, as illustrated.

In general, the machine vision device 150 comprises a housing including processor(s), memory, camera(s), light source(s), controller(s), etc. that may be affixed to, or positioned near, e.g., a manufacturing line. The machine vision device 150 captures images of items/articles of a manufacturing process, and analyzes the images based on a configuration of the machine vision device 150. Configurations of the machine vision device 150 may include various image analysis algorithms, as described herein. Depending on image analysis results, the machine vision device 150 may output a signal, e.g., to stop the manufacturing line or process, reject articles, cause sending of alerts, etc. Image analysis may be performed on the machine vision device 150, rather than remotely, to enable rapid responses to the results of such analysis.

Images and analysis results/data may be stored in a memory of the machine vision device 150 (e.g., a computer readable storage medium). The images and analysis results may also be automatically transmitted from the machine vision device 150, e.g., to management server 140. The management server 140 may thereby receive images and analysis results from multiple machine vision devices 150, and may aggregate and perform further analyses on the images and analysis results from multiple machine vision devices 150.

The management server 140 may communicate with the machine vision device(s) 150 to enable remote, rapid configuration of the machine vision device(s) 150. Such configuration may be accomplished via interactive graphical user interfaces provided by the management server 140 and accessible by the user device(s) 120, for example. Via the management server 140, and/or directly by communication with the machine vision device(s) 150, user device(s) 120 may access real-time views of status, image analysis, etc. of the machine vision device(s) 150. Communications with the machine vision device(s) 150 may be accomplished via web-servers executing on the machine vision devices 150 themselves.

In some embodiments, the features and services provided by the management server 140 may be implemented as web services consumable via the network 130. In further embodiments, the management server 140 is provided by one or more virtual machines implemented in a hosted computing environment. The hosted computing environment may include one or more rapidly provisioned and released computing resources, which computing resources may include computing, networking and/or storage devices.

In general, the optional human machine interface ("HMI") device(s) 170 may be any computing device such as a desktop, laptop or tablet computer, personal computer, tablet computer, wearable computer, server, personal digital assistant (PDA), hybrid PDA/mobile phone, mobile phone, smartphone, set top box, voice command device, digital media player, and the like. A human machine interface device 170 may execute an application (e.g., a browser, a stand-alone application, etc.) that allows a user to access interactive user interfaces, view images, analyses, or aggregated data, and/or the like as described herein. The human machine interface device(s) 170 may communicate with the machine vision device(s) 150, e.g., via accessing web-servers running on the machine vision device(s) 150 that provide interactive graphical user interfaces to the human machine interface device(s) 170. Users may thereby configure and/or monitor status of the machine vision device(s) 150 via the human machine interface device(s) 170. Typically, the human machine interface device(s) 170 may communicate with the machine vision device(s) 150 via a local network (e.g., a network local to, or on-site at, a particular organization).

The optional additional device(s) 180 may comprise various components of a manufacturing line or process, e.g., tower lights, conveyor belts, rejection systems, sensors, and/or the like. The machine vision device(s) 150 may communicate with the additional device(s) 180 to receive information from the additional device(s) 180, and/or to provide outputs/controls to the additional device(s) 180. Communications with the additional device(s) 180 may be accomplished via one or more application programming interfaces ("APIs"). Communications with the additional device(s) 180 may also be accomplished via intermediate communications with existing or legacy devices, such as specialized PLCs (e.g., the controller device 150 may include PLC control languages for communicating with PLCs, such as IEC 61131-3), and/or the like.

Various example user devices 120 are shown in FIG. 1, including a desktop computer, laptop, and a mobile phone, each provided by way of illustration. In general, the user devices 120 can be any computing device such as a desktop, laptop or tablet computer, personal computer, tablet computer, wearable computer, server, personal digital assistant (PDA), hybrid PDA/mobile phone, mobile phone, smartphone, set top box, voice command device, digital media player, and the like. A user device 120 may execute an application (e.g., a browser, a stand-alone application, etc.) that allows a user to access interactive user interfaces, view images, analyses, or aggregated data, and/or the like as described herein. In various embodiments, users may interact with various components of the example operating environment 100 (e.g., the management server 140, the machine vision device(s) 150, the human machine interface device(s) 170, etc.) via the user device(s) 120. Such interactions may typically be accomplished via interactive graphical user interfaces, however alternatively such interactions may be accomplished via command line, and/or other means.

The network 130 may include any wired network, wireless network, or combination thereof. For example, the network 130 may be a personal area network, local area network, wide area network, over-the-air broadcast network (e.g., for radio or television), cable network, satellite network, cellular telephone network, or combination thereof. As a further example, the network 130 may be a publicly accessible network of linked networks, possibly operated by various distinct parties, such as the Internet. In some embodiments, the network 130 may be a private or semi-private network, such as a corporate or shared intranet. The network 130 may include one or more wireless networks, such as a Global System for Mobile Communications (GSM) network, a Code Division Multiple Access (CDMA) network, a Long Term Evolution (LTE) network, or any other type of wireless network. The network 130 can use protocols and components for communicating via the Internet or any of the other aforementioned types of networks. For example, the protocols used by the network 130 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The local network 160 may similarly include any wired network, wireless network, or combination thereof. In general, however, the local network 160 illustrated in FIG. 1 represents a network that may be local to a particular organization, e.g., a private or semi-private network, such as a corporate or shared intranet. In some implementations, devices may communicate via the local network 160 without traversing an external network 130 such as the Internet. In some implementations, devices connected via the local network 160 may be walled off from accessing the network 130 (e.g., the Internet), e.g., by a gateway device, unless specifically granted access to the network 130. Accordingly, e.g., the human machine interface device(s) 170 (and/or user device(s) 120) may communicate with the machine vision device 150 directly (via wired or wireless communications) or via the local network 160, without traversing the network 130. Thus, even if the network 130 is down, or is not currently providing connectivity to the management server 140, the machine vision device(s) 150 and the human machine interface device(s) 170 (and/or the user device(s) 120) may continue to communicate and function via the local network 160 (or via direct communications).

For example, the network 160 may be a personal area network, local area network, wide area network, over-the-air broadcast network (e.g., for radio or television), cable network, satellite network, cellular telephone network, or combination thereof. As a further example, the network 160 may be a publicly accessible network of linked networks, possibly operated by various distinct parties, such as the Internet. In some embodiments, the network 160 may be a private or semi-private network, such as a corporate or shared intranet. The network 160 may include one or more wireless networks, such as a Global System for Mobile Communications (GSM) network, a Code Division Multiple Access (CDMA) network, a Long Term Evolution (LTE) network, or any other type of wireless network. The network 160 can use protocols and components for communicating via the Internet or any of the other aforementioned types of networks. For example, the protocols used by the network 160 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

In various embodiments, communications among the various components of the example operating environment 100 may be accomplished via any suitable means. For example, the machine vision device(s) 150 may communicate with one another, the additional device(s) 180, the human machine interface device(s) 170, the management server 140, and/or the user device(s) 120 via any combination of the network 130, the local network 160, or any other wired or wireless communications means or method (e.g., Bluetooth, WiFi, infrared, cellular, etc.).

Further details and examples regarding the implementations, operation, and functionality, including various interactive graphical user interfaces, of the various components of the example operating environment 100 are described herein in reference to various figures.

IV. Example Management Device/Server

Figure 2:
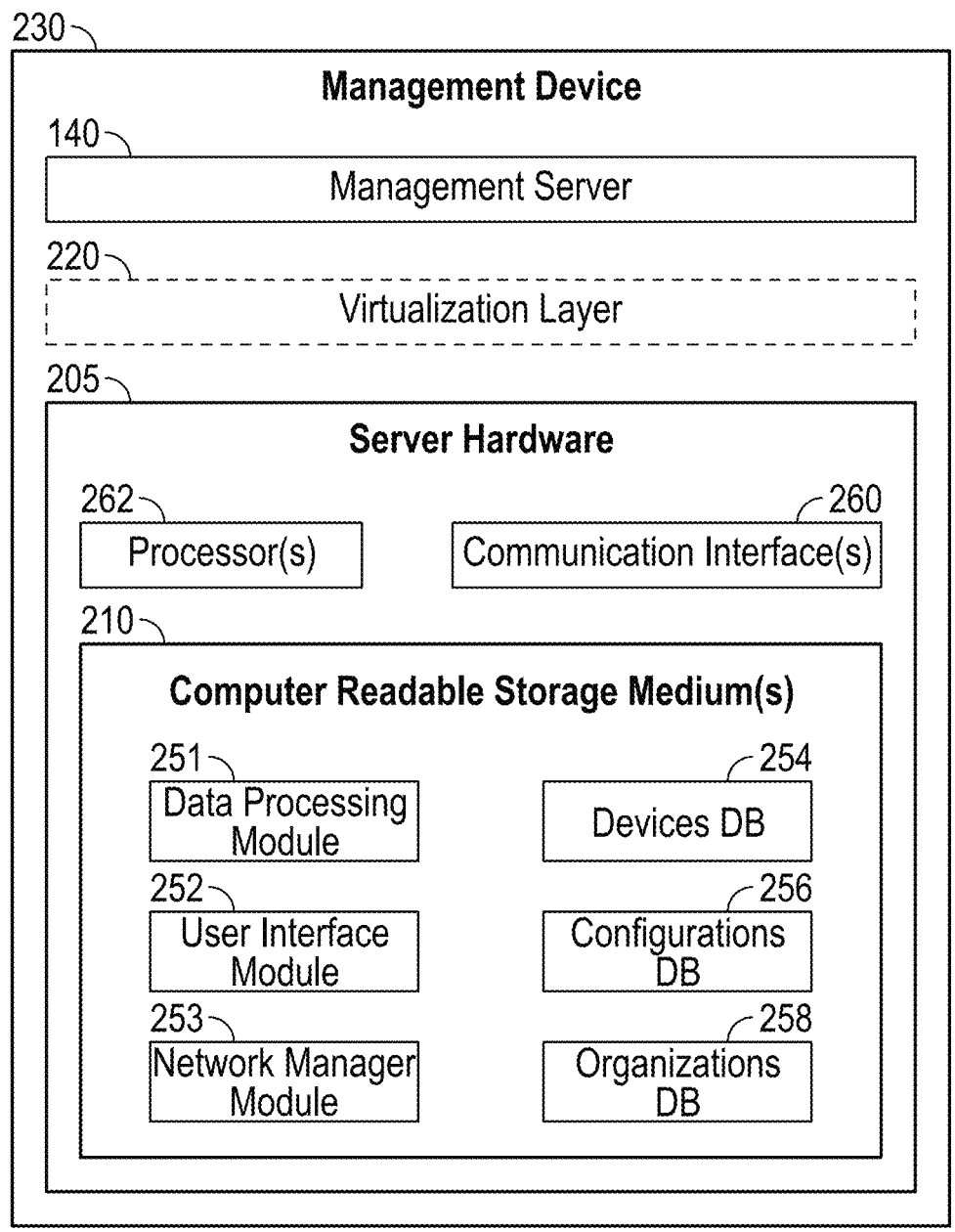
FIG. 2 illustrates a block diagram including an example implementation of a management device, according to various embodiments of the present disclosure.

FIG. 2 illustrates a block diagram including an example implementation of a management device 230, according to various embodiments of the present disclosure. In the example implementation, management device 230 includes management server 140, which management server 140 may be a Web or cloud server, or a cluster of servers, running on one or more sets of server hardware. In an embodiment, the management server 140 works for both single and multi-tenant installations, meaning that multiple organizations with different administrators may have, e.g., multiple machine vision devices, human machine interface devices, and additional devices managed by the same management server.

According to various embodiments, management server 140 may be implemented on management device 230 (or multiple devices similar to management device 230), which includes server hardware 205. Server hardware 205 includes one or more communication interfaces 260, one or more processors 262, and one or more computer readable storage mediums 210, each of which may be in communication with one another. The computer readable storage medium 210 includes data processing module 251, user interface module 252, network manager module 253, devices database 254, configurations database 256, and organizations database 258. In various implementations, the various databases of the management device 230 may be combined or separated/partitioned as appropriate to implement the functionality described herein, and to maintain security and separation of data, e.g., for different organizations. In various implementations, the various databases may or may not be stored separately from the management device 230.

In various implementations one or more buses, interconnects, wires/cables, etc. may be used to interconnect the various components of the server hardware 205. In various implementations one or more interfaces, APIs, communication layers, buses, interconnects, wires/cables, etc. may be used to interconnect the various components of the management device 230.

In operation, the one or more communication interfaces 260, one or more processors 262, and one or more computer readable storage mediums 210 communicate with one another to, e.g., execute by the processor(s) 262 computer program instructions (e.g., as provided by the user interface module 252); receive, access, and transmit data (e.g., to/from the databases and via the communication interface(s) 260); and/or the like. In general, the server hardware 205 enables the functionality of the management server 140 as described herein. Further implementation details are described below.

In operation, the communication interface(s) 260 may provide wired and/or wireless communications with other devices and networks, as described herein. In various embodiments, communications among the various components of the example operating environment 100 may be accomplished via any suitable means. For example, the management server 140 and/or management device 230 may communicate with the machine vision device 150, the human machine interface device(s) 170, the additional device(s) 180, and/or the user device(s) 120 via any combination of the network 130, the local network 160, or any other communications means or method (e.g., Bluetooth, WiFi, infrared, cellular, etc.). Accordingly, the communications interface(s) 260 may include one or more of wired and wireless transceivers, such as a Joint Test Action Group (JTAG) transceiver, a Bluetooth or Bluetooth Low Energy (LE) transceiver, an IEEE 802.11 transceiver, an Ethernet transceiver, a USB transceiver, a Thunderbolt transceiver, an infrared transceiver, a wireless cellular telephony transceiver (e.g., 2G, 3G, 4G, 5G), or the like.

In operation, data processing module 251 may provide processing and analysis of data (e.g., data received from the various devices, including the machine vision devices and/or additional devices) as described herein. The data processing/analysis may usefully provide insights and information that may be provided via various interactive graphical user interfaces, as described herein.

In operation, the user interface module 252 may provide the various interactive graphical user interface functionality described herein. This may include, for example, generating user interface data useable for rendering the various interactive user interfaces described. The user interface data may be used by various computer systems, devices, and/or software programs (for example, a browser program of a user device 120), to render the interactive user interfaces. The interactive user interfaces may be displayed on, for example, electronic displays (including, for example, touch-enabled displays). For example, the user interface module 252 may provide various network accessible interactive graphical user interfaces, e.g., to allow the administrators of the various organizations and devices to create and log into an account associated with an organization to which a set of devices belong (e.g., machine vision devices and additional devices), and manage, and access data associated with, those devices as described herein.

In operation, the network manager module 253 may provide communication with and configuration and management of the various devices associated with each organization. This may include, for example, receiving and managing information related to the various devices (e.g., machine vision devices, additional devices, and human machine interface devices) at the time of manufacture, associating devices with particular organizations when they are purchased/claimed and implemented by the organizations (e.g., the claiming may be performed at least in part by populating the devices database 254 and the organizations database 258 with appropriate information when the devices are associated with an organization), receiving data from the various devices (e.g., and storing the data in the devices database 254 or other appropriate database), sending data to various devices (e.g., sending and/or syncing configurations stored in the configurations database 256 to/with various devices), and/or the like.

In operation, the devices database 254 may store information regarding the machine vision devices 150, human machine interface devices 170, and/or additional devices 180, and various relationships and associations among these devices. This information may include identifiers associated with these devices, data received from these devices, images and analysis data from these devices, etc.

In operation, the configurations database 256 may store information regarding configurations of the machine vision devices 150, human machine interface devices 170, and additional devices 180.

In operation, the organizations database 258 may store information regarding the organizations to which the machine vision devices 150, human machine interface devices 170, and additional devices 180 belong.

In various embodiments, the management server 140, as implemented by the management device 230, may include various other modules, components, engines, etc. to provide the functionality as described herein. It will be appreciated that additional components, not shown, may also be part of the management server 140 and/or the management device 230, and, in certain embodiments, fewer components than that shown in FIG. 2 may also be used in the management server 140 and/or the management device 230. For example, the management server 140 may include a security module used to manage cryptographic keys, certificates, and/or other data associated with establishing secure communication with various other devices. For example, the devices database 254 may include an identifier of each device (e.g., a serial number), a secret to be used to establish a secure communication with the devices of the same organization, and/or a mechanism to authenticate the devices' identity (e.g., the public key of a private public key pair, the private key of which was embedded or stored in the device during the manufacturing, etc.).

While various embodiments do not implement virtualization, alternative embodiments may use different forms of virtualization—represented by a virtualization layer 220 in the management device 230. In these embodiments, the management server 140 and the hardware that executes it form a virtual management server, which is a software instance of the modules and/or databases stored on the computer readable storage medium 210.

For example, in an implementation the management device 230 (or one or more aspects of the management device 230, e.g., the management server 140) may comprise, or be implemented in, a "virtual computing environment". As used herein, the terms "virtual computing environment", "virtualization", "virtual machine", and/or the like should be construed broadly to include, for example, computer readable program instructions executed by one or more processors (e.g., as described below) to implement one or more aspects of the modules and/or functionality described herein. Further, in this implementation, one or more modules/engines/etc. (e.g., user interface module 252) and/or databases of the management device 230 may be understood as comprising one or more rules engines of the virtual computing environment that, in response to inputs received by the virtual computing environment, execute rules and/or other program instructions to modify operation of the virtual computing environment. For example, a request received from the user device(s) 120 may be understood as modifying operation of the virtual computing environment to cause modules to gather data, generate or transmit configurations, generate or transmit user interfaces, etc. Such functionality may comprise a modification of the operation of the virtual computing environment in response to inputs and according to various rules. Other functionality implemented by the virtual computing environment (as described throughout this disclosure) may further comprise modifications of the operation of the virtual computing environment, for example, the operation of the virtual computing environment may change depending on the information gathered and/or responses received and analyzed. Initial operation of the virtual computing environment may be understood as an establishment of the virtual computing environment. In some implementations the virtual computing environment may comprise one or more virtual machines, virtualization layers, containers, and/or other types of emulations of computing systems or environments. In some implementations the virtual computing environment may comprise a hosted computing environment that includes a collection of physical computing resources that may be remotely accessible and may be rapidly provisioned as needed (commonly referred to as "cloud" computing environment).

Implementing one or more aspects of the management device 230 as a virtual computing environment may advantageously enable executing different aspects or modules of the system on different computing devices or processors, which may increase the scalability of the system. Implementing one or more aspects of the management device 230 as a virtual computing environment may further advantageously enable sandboxing various aspects, data, or modules of the system from one another, which may increase security of the system by preventing, e.g., malicious intrusion into the system from spreading. Implementing one or more aspects of the management device 230 as a virtual computing environment may further advantageously enable parallel execution of various aspects or modules of the system, which may increase the scalability of the system. Implementing one or more aspects of the management device 230 as a virtual computing environment may further advantageously enable rapid provisioning (or de-provisioning) of computing resources to the system, which may increase scalability of the system by, e.g., expanding computing resources available to the system or duplicating operation of the system on multiple computing resources. For example, the system may be used by thousands, hundreds of thousands, or even millions of users simultaneously, and many megabytes, gigabytes, or terabytes (or more) of data may be transferred or processed by the system, and scalability of the system may enable such operation in an efficient and/or uninterrupted manner.

V. Example Machine Vision Device

Figure 3:
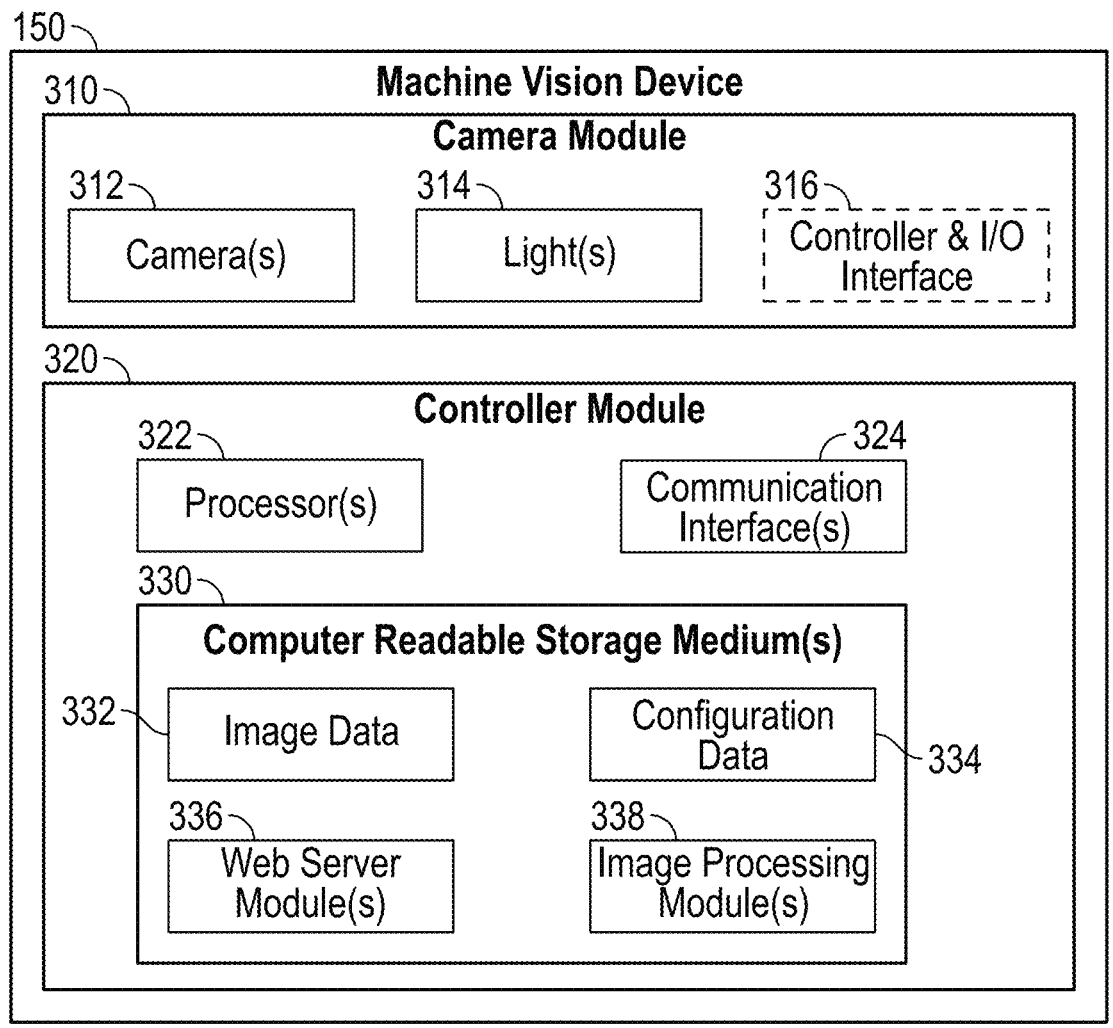
FIG. 3 illustrates a block diagram of an example machine vision device, according to various embodiments of the present disclosure.

FIG. 3 illustrates a block diagram of an example machine vision device 150, according to various embodiments of the present disclosure. Machine vision device 150 may comprise a camera module 310 and a controller module 320. In various implementations, the camera module 310 and the controller module 320 may be housed in different housings, and/or may be housing in a same housing. In various implementations, the various components and functionality of the machine vision device 150 (including the components and functionality of the camera module 310 and the controller module 320) described herein may be combined, separated, and/or re-organized.

The camera module 310 may include one or more cameras 312, one or more lights 314, and an optional controller and input/output interface 316.

The camera(s) 312 may include lenses and imaging sensors appropriate for an application of the machine vision device 150. For example, the camera(s) 312 may comprise CCD, CMOS, or other types of imaging sensors, and the imaging sensor may be of various sizes (e.g., ⅓" or other appropriate size). The camera(s) 312 may include one or more lenses, and the lenses may be of various focal lengths. In various implementations, the camera(s) 312 may provide image data of various resolutions (e.g., 1280(H)×960 (V) pixels, 1080p, 2K, 4K, 8K, or higher or lower resolutions), acquisition rates (e.g., 20 frames per second, or higher or lower rates), exposure times (e.g., $\frac{1}{10,000}$ to $\frac{1}{10}$ second, or higher or lower times), fields of view, etc. In various implementations, image data from two or more camera(s) 312 may be obtained by the camera module 310 and, e.g., combined (e.g., by hardware and/or software algorithms).

The light(s) 314 may include various types and/or combinations of lights, e.g., LEDs and/or the like. The light(s) 314 may include various filters. Various different illumination levels, colors, temperatures, and/or the like may be provided. The light(s) 314 may be arranged in various arrangements, and may be positioned on a housing of the machine vision device 150 or camera module 310, or separate from these components (e.g., external illumination may be provided, which may be a separate product from the machine vision device 150). In various arrangements the light(s) 314 may be turned on and/or off, collectively and/or individually.

The optional controller and input/output interface 316 may comprise hardware and/or software components that may provide control of the camera(s) 312 and/or light(s) 314, and may further provide for communication of image data. In various implementations the controller and input/output interface 316 may provide communication between the camera module 310 and the controller module 320. Alternatively, the camera(s) 312 and/or the light(s) 314 may be integrated with the controller module 320 and may communicate directly with various components of the controller module 320.

In various implementations one or more buses, interconnects, wires/cables, etc. may be used to interconnect the various components of the camera module 310.

In operation, as described herein, the light(s) 314 may be activated during image data acquisition to illuminate an item of interest, and the camera(s) 312 may capture image data of the item of interest. The image data may comprise may comprise one or more successive images, and the images may be captures with varying illumination. The light(s) 314 may be activated in a variety of patterns, cadences, brightnesses, etc. The image data (e.g., one or more images) of the item of interest may then be passed to the controller module 320, e.g., via the controller and input/output interface 316 for storage and/or processing.

The controller module 320 may include one or more processors 322, one or more communication interfaces 324, and one or more computer readable storage mediums 330, each of which may be in communication with one another. The computer readable storage medium(s) 330 may include image data 332, configuration data 334, web server module (s) 336, and image processing module(s) 338. The image data 332 and the configuration data 334 may be stored in one or more databases of the controller module 320, and/or may be stored on virtualization mediums in the cloud. In various implementations one or more buses, interconnects, wires/cables, etc. may be used to interconnect the various components of the controller module 320, and of the machine vision device 150 more generally.

In operation, the one or more communication interfaces 324, one or more processors 322, and one or more computer readable storage mediums 330 communicate with one another to, e.g., execute by the processor(s) 322 computer program instructions (e.g., as provided by the configuration data 334, the web server module(s) 336, and/or the image processing module(s) 338); receive, access, and transmit data (e.g., to/from the image data 332 and/or configuration data 334, and via the communication interface(s) 324); and/or the like. In general, the controller module 320, in connection with the camera module 310, enables the functionality of the machine vision device 150 as described herein. Further implementation details are described below.

In operation, the communication interface(s) 324 may provide wired and/or wireless communications with other devices and networks, as described herein. In various embodiments, communications among the various components of the example operating environment 100 may be accomplished via any suitable means. For example, the machine vision device(s) 150 may communicate with one another, the additional device(s) 180, the human machine interface device(s) 170, the management server 140, and/or the user device(s) 120 via any combination of the network 130, the local network 160, or any other communications means or method (e.g., Bluetooth, WiFi, infrared, cellular, etc.). Accordingly, the communications interface(s) 324 may include one or more of wired and wireless transceivers, such as a Joint Test Action Group (JTAG) transceiver, a Bluetooth or Bluetooth Low Energy (LE) transceiver, an IEEE 802.11 transceiver, an Ethernet transceiver, a USB transceiver, a Thunderbolt transceiver, an infrared transceiver, a wireless cellular telephony transceiver (e.g., 2G, 3G, 4G, 5G), or the like. As noted herein, the communications interface(s) 324 may further include one or more application programming interfaces ("APIs").

In operation, the image data 332 includes images, analysis data or results, image data acquired by the machine vision device 150, e.g., via the camera module 310. Such image data 332 may include data processed by the machine vision device 150 (e.g., via the image processing module(s) 338).

In operation, the configuration data 334 includes one or more configurations that configure operation of the machine vision device 150, as described herein. For example, such configurations may be received from a user and/or the management device 230 (and/or other devices in communication with the machine vision device 150), and may include one or more algorithms or processes for processing the image data. The machine vision device 150 may store multiple configurations in the configuration data 334, which may be selectively run or implemented, e.g., via user selection via the management server 140, the human machine interface device(s) 170, and/or the user device(s) 120.

In operation, the web server module(s) 336 may include program code executable, e.g., by the processor(s) 322 to provide a web-based access (e.g., interactive graphical user interfaces accessible via web-based communications protocols, rendering of interactive graphical user interfaces written in web-based languages by web-based browsers, etc.) to the machine vision device 150, e.g., to configure the machine vision device 150 and/or access data of the machine vision device 150, as further described herein. Such web-based access may be via one or more communications protocols, e.g., TCP/IP, UDP, WebRTC, etc., and may include one or more secure communications/cryptographic protocols, e.g., TLS, SSL, etc., and may further be provided via communications interface(s) 324. This may include, for example, generating user interface data useable for rendering the various interactive user interfaces described. The user interface data may be used by various computer systems, devices, and/or software programs (for example, a browser program of a user device 120), to render the interactive user interfaces. The interactive user interfaces may be displayed on, for example, electronic displays (including, for example, touch-enabled displays). In various implementations one or more of the management server 140, user device(s) 120, and human machine interface device(s) 170 may communicate with the machine vision device 150 via one or more of the web server module(s) 336.

In operation, the image processing module(s) 338 may provide processing and analysis of images/image data (e.g., images/image data received via the camera module 310) as described herein. The type of processing and analysis may be provided by the configuration data 334, and may result in one or more outputs from the machine vision device 150 that may be provided via the communications interface(s) 324, as further described herein. In various implementations, the image processing module(s) 338 may be executed by the processor(s) 322, which processor(s) 322 may include various types of processors including special purposes processors, e.g., Graphics Processing Units ("GPUs"), Application Specific Integrated Circuits ("ASICs"), Field-Programmable Gate Arrays ("FPGAs"), and/or the like.

As described herein, image data, analysis results, and/or configuration data may be communicated, e.g., via the communications interface(s) 324, to other devices, such as the management server 140 and/or user device(s) 120. For example, the machine vision device 150 may be configured to reliably and securely offload and/or communicate data and to transmit the data to the management server 140 regardless of whether the connectivity of the machine vision device 150 (e.g., to the management server 140) is intermittent. For example, data may be stored by the machine vision device 150 until connectivity is available, and may then transmit the data to the management server 140.

In various implementations, as described above, the machine vision device(s) 150 may communicate with one or more additional devices 180, which may include, e.g., various components of a manufacturing line or process, sensors, etc. Communications with additional device(s) 180 may be via direct (e.g., not via a network) wired and/or wireless communications, and/or may be via a network (e.g., a local network) wired and/or wireless communications. Such communications may be accomplished via one or more APIs. Communications with the additional device(s) 180 may also be accomplished via intermediate communications with existing or legacy devices, such as specialized PLCs and/or the like.

In various implementations, as described above, the machine vision device(s) 150 may communicate with one or more human machine interface devices 170. Communications with human machine interface device(s) 170 may be via direct (e.g., not via a network) wired and/or wireless communications, and/or may be via a network (e.g., a local network) wired and/or wireless communications. Via communications with the human machine interface device(s) 170, users may configure and/or monitor status of the machine vision device 150. As described herein, the machine vision device(s) 150 may advantageously communicate with the human machine interface device(s) 170 via the web server module(s) 336.

In various embodiments, the machine vision device 150, may include various other modules, components, engines, etc. to provide the functionality as described herein. It will be appreciated that additional components, not shown, may also be part of the machine vision device 150, and, in certain embodiments, fewer components than that shown in FIG. 3 may also be used in the machine vision device 150.

In various embodiments, firmware of the machine vision device 150 may be updated such that the machine vision device 150 may provide additional functionality. Such firmware updating may be accomplished, e.g., via communications with the management server 140, thereby enabling updating of multiple machine vision device 150 remotely and centrally. Additional functionality may include, for example, additional image analysis algorithms, additional ways of communicating with additional devices 180, additional configurations or options for configurations, and/or the like.

VI. Example Human Machine Interface Device

Referring again to FIG. 1, human machine interface ("HMI") device(s) 170 may comprise computing devices that provide a means for a user to interact with a device. Human machine interfaces may comprise user interfaces or dashboards that connect a user with a machine, system, or device, commonly used in industrial processes. In various implementations, human machine interface device(s) 170 comprise computer devices with a display and a mechanism for user input (e.g., mouse, keyboard, voice recognition, touch screen, and/or the like). In an implementation, the human machine interface device(s) 170 comprise tablet computing devices. In other implementations, the human machine interface device(s) 170 comprise any other suitable computing devices.

As noted above, the human machine interface device(s) 170 may communicate with the machine vision device 150 and/or the management server 140 via direct (e.g., not via a network) wired and/or wireless communications, and/or via a network (e.g., a local network) wired and/or wireless communications. In one example, a human machine interface device 170 communicates with a machine vision device 150 via a local network and a web server module 336 of the machine vision device 150. In this example, the human machine interface device 170 is directed to connect with the machine vision device 150 (e.g., via an IP address and, optionally, a particular port of the machine vision device 150, or a unique identifier or name associated with the machine vision device 150) of the machine vision device 150, and the web server module 336 of the machine vision device 150 provides a browser-renderable webpage including an interactive HMI. The interactive HMI may include a current status or configuration of the machine vision device 150, access to a video feed from the camera(s) 312 of the machine vision device 150, options to change configuration of the machine vision device 150, and/or the like. In another example, a human machine interface device 170 communicates with a machine vision device 150 via a local network and a mobile app based module of the machine vision device 150. In this example, the human machine interface device 170 is directed to connect with the machine vision device 150 (e.g., via an address and an API and, optionally, a particular port of the machine vision device 150, or a unique identifier or name associated with the machine vision device 150) of the machine vision device 150, and the mobile app based module of the machine vision device 150 provides an API by which a mobile app of the human machine interface device 170 may communicate with the machine vision device 150 and provide an interactive graphical user interface including an interactive HMI on the human machine interface device 170.

Advantageously, according to various embodiments, a user may configure an interactive HMI user interface layout via the management server 140 (and/or the machine vision device(s) 150 via the management server 140), and may then push the interactive HMI user interface layout configuration to machine vision device(s) 150 (e.g., via the management server 140). The machine vision device(s) 150 may then provide the configured interactive HMI via the web server module(s) 336 as described herein. Advantageously, such functionality may enable remote and centralized configuration of interactive HMIs (and possible duplication of HMIs to multiple machine vision devices 150) without requiring direct programming or interaction with the machine vision device(s) 150 or human machine interface device(s) 170.

Advantageously, because the HMI is provided by a web server module 336 of the machine vision device 150, multiple human machine interface devices 170, and/or the management server 140 may simultaneously access and/or communicate with the machine vision device 150 (e.g., via the HMI provided via the web server module(s) 336, and/or via other communications means), and a current configuration/status of the machine vision device 150 may be accurately kept synchronized/kept up-to-date from each device.

VII. Example Additional Devices

Referring again to FIG. 1, additional device(s) 180 may include, e.g., various components of a manufacturing line or process, sensors, and/or the like. For example, additional device(s) 180 may include detection devices that may include a trigger input to the machine vision device(s) 150, rejection devices to which the machine vision device(s) 150 may provide an output to reject articles, machinery inputs to which the machine vision device(s) 150 may provide an output in response to various image analyses (e.g., to speed up or slow down a manufacturing process, to adjust a manufacturing process, to actuate or operate a machine, to execute a process, to activate or deactivate a light or process, to communicate with an automated process or device, to communicate with a software program, etc.), multiple components/devices on a manufacturing line to which the machine vision device(s) 150 may provide configurations, sensors that may provide machine vision device(s) 150 with input information that may be used by the machine vision device(s) 150 and/or provided by the machine vision device (s) 150 to the management server 140, and/or the like. Additional non-limiting examples of additional device(s) 180 include:

Sensors/monitors (e.g., temperature, levels, vibration, power, pressure, etc.)
Facility meters (e.g., water, air, gas, energy, steam, etc.)
Machine/systems I/O (e.g., relays, contacts, valves, flow, etc.)
Legacy equipment (e.g., programmable logic controllers ("PLCs"), controllers, etc.)

As described herein, additional device(s) 180 may be communicated with and/or configured via the machine vision device(s) 150. Communications with the additional device(s) 180 may also be accomplished via intermediate communications with existing or legacy devices, such as specialized PLCs and/or the like. Alternatively, additional device(s) 180 may be communicated with and/or configured via communication with human machine interface device(s) 170, management server 140, and/or user device(s) 120. Data and information gathered from the additional device(s) 180 may be provided to the management server 140, e.g., via the machine vision device(s) 150 and/or directly (e.g., via a network).

In various implementations one or more of, or a combination of, the machine vision device(s) 150, the management server 140, and/or the human machine interface device(s) 170 may provide an application programming interface ("API") by which communications may be accomplished with the additional device(s) 180.

VIII. Example Machine Vision Device Functionality

Figure 4:
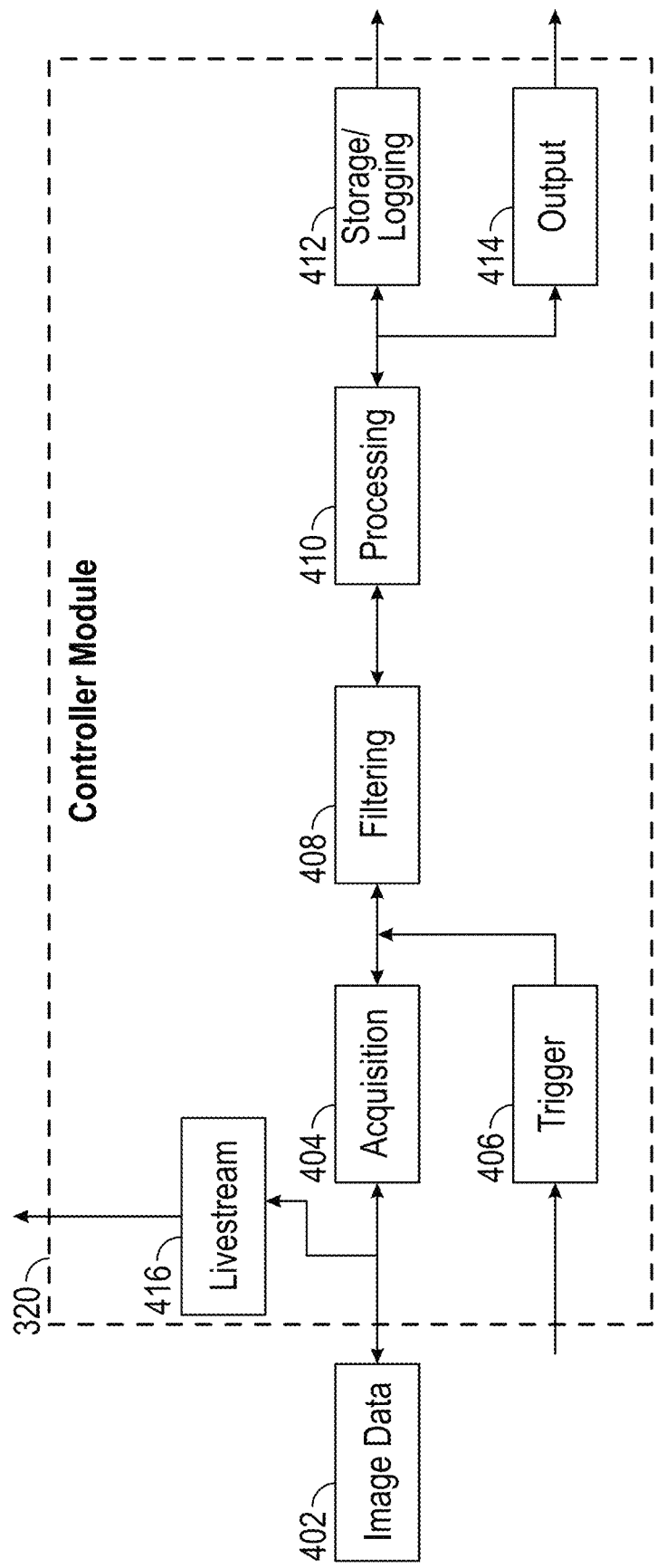
FIG. 4 illustrates a block diagram of an example controller module of a machine vision device, according to various embodiments of the present disclosure.

FIG. 4 illustrates a block diagram of an example controller module 320 of a machine vision device, according to various embodiments of the present disclosure. In particular, FIG. 4 illustrates certain example functional blocks of the controller module 320, according to various embodiments. The functionality of the controller module 320 as described in reference to the functional blocks of FIG. 4 may be provided by, for example, at least the image processing module(s) 338 as executed by the processor(s) 322. The functionality described in reference to FIG. 4, and optionally in combination with certain other functionalities of the present disclosure, with respect to images may broadly and generally be referred to herein as processing images, analyzing images, an "evaluations" of images, and/or the like.

In operation, image data 402 may be received, e.g., from the camera module 310. As described herein, the image data 402 may include data acquired by camera(s) 312 and passed to the controller module 320 via the controller and input/output interface 316.

Such image data 402 may be acquired by the controller module 320 at acquisition block 404. As the image data 402 may comprise a continuous stream of image data, a trigger input 406 may be used to obtain individual images from the image data 402. Trigger input 406 may be received by the controller module 320 via communications interface(s) 324 from, e.g., an opto-electric presence sensor, break beam, or other sensor (or additional device 180), that may, e.g., detect the presence or movement of items or articles on a manufacturing line. Alternatively, trigger input 406 may be provided based on a timing of a moving line (which may be signaled by, e.g., an encoder, counter, etc.), and/or other suitable source. Trigger input 406 may be provided via any suitable communications protocol, e.g., General Purpose Input Output ("GPIO") and/or the like. Accordingly, using the trigger input 406, the controller module 320 may acquire individual images from the image data 402, wherein each of the images includes an individual different item/article.

At block 408, the images may be filtered to make them more suitable for further processing. Filtering may include, for example, adjusting gain, adjusting exposure, equalization, sharpening, rotation, advanced filtering algorithms, and/or the like.

At block 410, the filtered images may be processed/analyzed according to one or more of any suitable method or algorithm. Processing/analyzing may include, for example, feature detection and matching, optical character/feature recognition ("OCR") (e.g., for detection of words, dates/expiration dates, etc.), detection/decoding of symbology features (such as barcodes, two-dimensional data matrices, Universal Product Codes, International Article Numbers, European Article Numbers, Interleaved-Two-of-Five (ITF), Code 32 Italian Pharmacode, Code 39, Code 93, Code 128, Code 25, Code 11, DotCode, MSI Plessey, GS1 Databar, QR Code, Micro QR Code, Data Matrix, PDF417, MicroPDF417, Codabar, Aztec Code, MaxiCode, GS1 Composite Codes, KIX, RM4SCC, etc.), blob detection, fixture detection, shape detection, edge detection, contour detection, measurement tools (e.g., distance, angle, etc.) and/or the like. Processing/analyzing may further include decision making, e.g., based on information obtained from the images. For example, the controller module 320 may determine, based on processing/analysis of an image and features of the image, that no article is present, that an article is damaged or defective, that a label is incorrect, that an expiration date is passed or incorrect, etc. In general, decisions made at block 410 for respective images may be selected from pass, reject, or "no read" (e.g., no article present). In various implementations, the controller module 320 may, e.g., count numbers of "passes", "rejects", and "no reads", so as to provide outputs/alerts (e.g., shut down a manufacturing line, etc.) based on the counts (e.g., as indicated by a configuration of the machine vision device 150).

In various embodiments, image analysis and/or decision making performed at block 410 may include execution of deterministic and/or non-deterministic analysis algorithms. In some embodiments, for example, the controller module 320 may read a date or label, and determine whether it is correct. In another example, the system may extract features from an image and compare to expected features. In another example, the controller module 320 may use machine learning and/or artificial intelligence algorithms for detection of patterns in the images (e.g., to detect whether a food item is properly constructed, etc.).

Accordingly, based on the processing at block 410, the device may provide an output 414. The output may be provided, e.g., via communications interface(s) 324, and may be provided to any external device, e.g., additional device(s) 180. Such an output may, e.g., cause signaling an alarm, stopping a conveyor line, actuation of a rejection device, sending of an alert, etc. Output 414 may be provided via any suitable communications protocol, e.g., General Purpose Input Output ("GPIO"), Webhook, and/or the like. Advantageously, the output 414 provided directly from the machine vision device 150 may eliminate the need for a separate PLC to, e.g., count a number of "rejects" or "no reads" so as to then, e.g., shut down a manufacturing line.

At block 412, the images and analysis data (e.g., any and/or all information associated with the analysis/processing, including, e.g., features detected, decisions made, etc.) may be stored and/or logged by the controller module 320, e.g., in a memory/computer readable storage medium. In some implementations, the images and analysis data may be stored indefinitely. In some implementations, the images and analysis data may be stored for a period of time, e.g., rolling based on an acquisition date/time, and then deleted. In some implementations, the images and analysis data may be stored or not stored, or stored for a period of time, based on an outcome/decision of the applicable processing/analysis. For example, images associated with a "pass" may be stored for a shorter period of time (or not at all), while images associated with a "reject" may be stored for a longer period of time. In some implementations, storage of the images and analysis data may be based on any combination of the above.

Advantageously, at block 412 the controller module 320 may also offload and/or communicate images and analysis data to the management server 140 (for storage and further analysis by the management server 140) via wired or wireless communications (e.g., via communications interface(s)

324). In some implementations, the images and analysis data may be offloaded and/or communicated prior to deletion of such images on the machine vision device 150. In some implementations, the images and analysis data may be offloaded in real-time or substantially real-time, or as long as communication with the management server 140 is available. In some implementations, the images and analysis data may be offloaded and/or communicated periodically, in batches, and/or on demand. In some implementations, the images and analysis data may be offloaded/communicated or not offloaded/communicated based on an outcome/decision of the applicable processing/analysis. In some implementations, the images and analysis data may be offloaded/communicated based on and age of the images and analysis data. In some implementations, the images and analysis data may be offloaded/communicated or not offloaded/communicated based on network bandwidth availability, time of day (e.g., to preserve bandwidth during business hours), a threshold or cap on network bandwidth usage, and/or the like. In some implementations, offloading/communicating of the images and analysis data may be based on any combination of the above.

In an implementation, a livestream 416 of the image data 402 may be provided to external devices. For example, the livestream 416 may be provided via User Datagram Protocol ("UDP") or WebRTC, and one or more of a web server module 336 or communications interface(s) 324, to user device(s) 120 (e.g., via any combination of network 130, local network 160, or management server 140). Accordingly, a user may access the livestream 416 in an interactive graphical user interface provided on a user device 120. Advantageously, the livestream 416 may be provided via a separate communications path, directly from the image data 402, and optionally via UDP or WebRTC, to avoid the overhead and resulting reduced efficiency that may be incurred if a livestream was obtained further down the processing pipeline (e.g., at output 414). In alternative embodiments, the livestream 416 may be provided via other suitable protocols, such as TCP/IP.

In various implementations, various aspects of the functionality described in reference to FIG. 4 may be accomplished in substantially real-time, e.g., image data/images may be processed as they are acquired. Alternatively, various aspects of the functionality described in reference to FIG. 4 may be accomplished in batches and/or in parallel.

In various implementations, the functionality described above in reference to FIG. 4 may be provided based on a configuration of the machine vision device 150. For example, the trigger, filtering, processing, and/or storage/logging functionality may be based on, and changed, according to a configuration of the machine vision device 150 and further described herein.

IX. Example Machine Vision Device Physical Implementation

Figure 5:
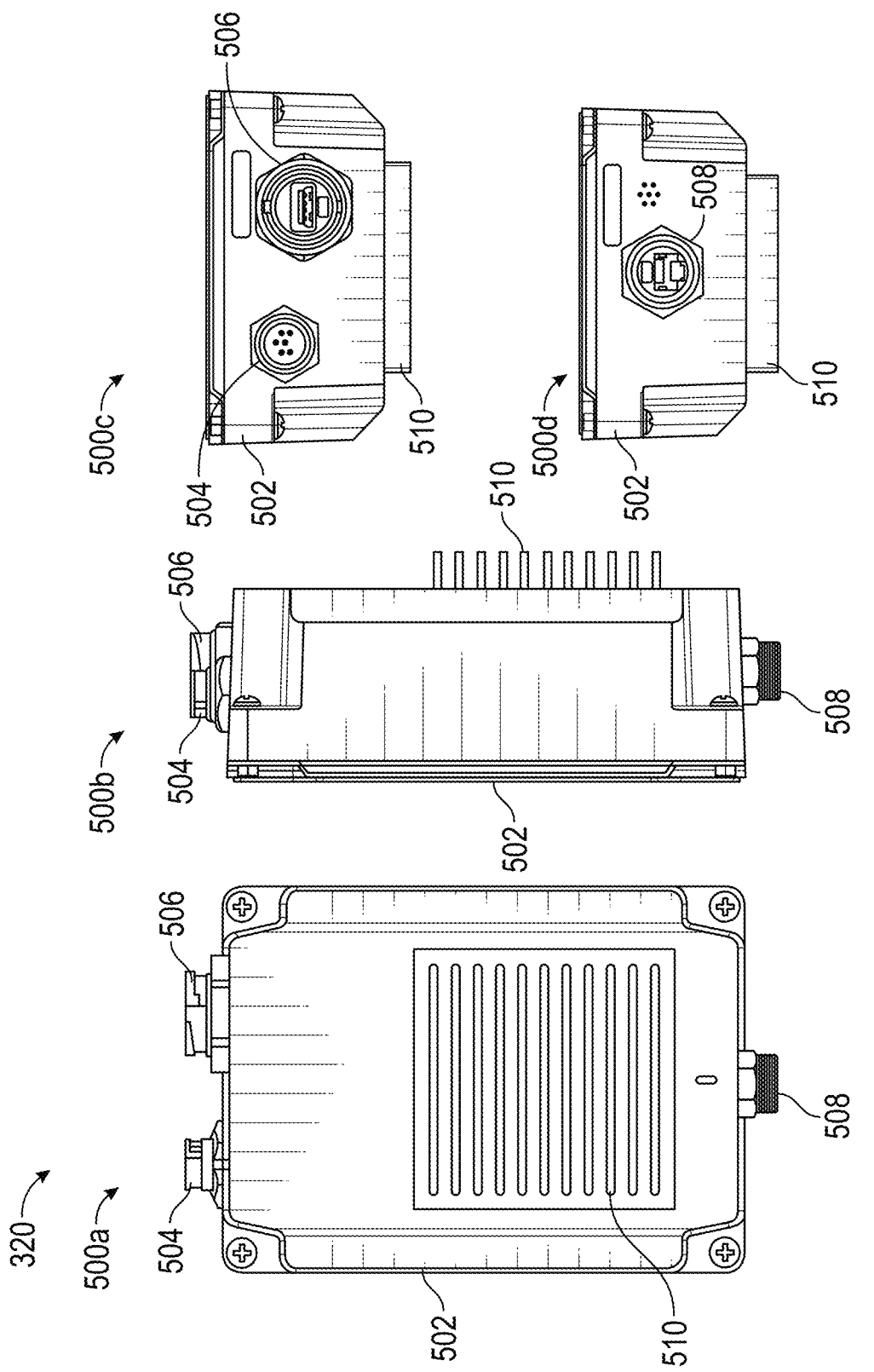
FIGS. 5-6 are diagrams of an example physical implementation of a machine vision device, according to various embodiments of the present disclosure.
Figure 6:
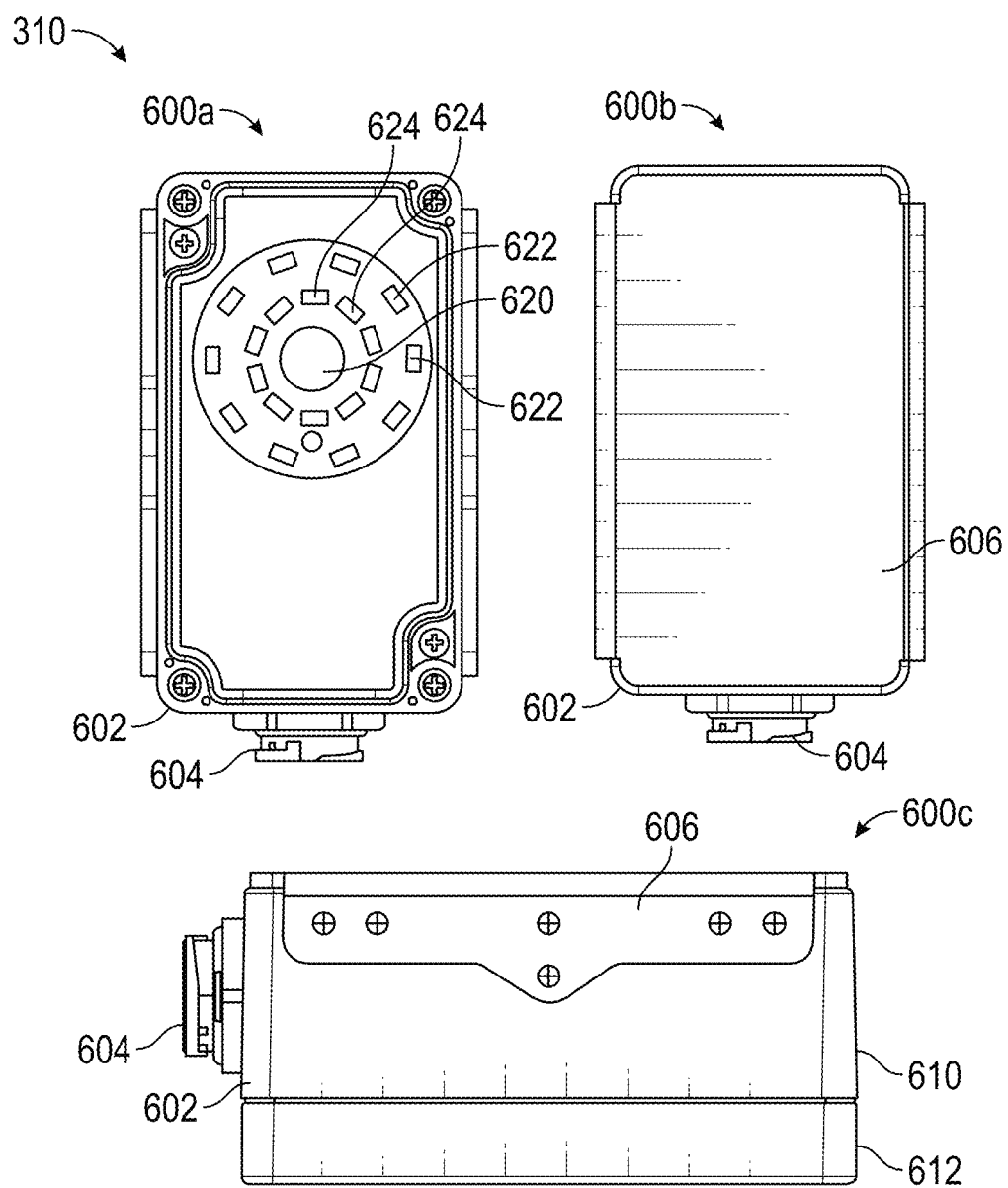

FIGS. 5-6 are diagrams of an example physical implementation of the machine vision device 150, according to various embodiments of the present disclosure. As described herein, while the embodiment described in reference to FIGS. 5-6 shows the camera module 310 and controller module 320 as separate housings, in various other implementations the camera module 310 and controller module 320 may be combined into a single housing, or may be further subdivided into additional housings (e.g., one or more light(s) 314 and/or one or more camera(s) 312 may be provided in separate devices/housings).

FIG. 5 shows a diagram of an example physical implementation of the controller module 320. The diagram includes a front view 500a, a left side view 500b, a top view 500c, and a bottom view 500d. As shown, the controller module 320 may include a housing 502, which may be made of metal (e.g., aluminum, stainless steel, etc.), plastic (e.g., UV-stabilized polycarbonate, etc.), and/or any other suitable material or combination of materials. The housing 502 may include fins 510 which serve as a heat sink for the controller module 320. The controller module 320 may further include a connector 504 that may enable connecting wire(s)/cable(s) to provide input/output for the controller module 320 (e.g., for trigger input 406, output 414, etc.). In an implementation the connector 504 comprises six pins, including pins for power, ground, input trigger, input common, output, and output common. The controller module 320 may further include a connector 506 that may enable connecting wire(s)/cable(s) to provide connection (e.g., input/output, power, etc.) to the camera module 310. In an implementation the connection to the camera module 310 is provided via USB. The controller module 320 may further include a connector 508 that may enable connecting wire(s)/cable(s) to provide input/output for the controller module 320 (e.g., for trigger input 406, output 414, wired Ethernet connection, etc.). In an implementation the connector 508 comprises an Ethernet plug.

In various embodiments, the controller module 320 may include a power supply internal to the housing 520, or external to the housing 520, which may provide power to the machine vision device 150.

In an implementation, the controller module 320 has general dimensions of 105×152×48 mm. In alternative implementations the controller module 320 may have different dimensions. In an implementation, the controller module 320 housing is rated IP67 under IEC standard 60529.

FIG. 6 shows a diagram of an example physical implementation of the camera module 310. The diagram includes a front view 600a, a bottom view 600b, and a left side view 600c. As shown, the camera module 310 may include a housing 602, which may be made of metal (e.g., aluminum, stainless steel), plastic (e.g., UV-stabilized polycarbonate), and/or any other suitable material or combination of materials. The housing 602 may comprise two parts, a body 610, and a cover 612. In an implementation, the cover 612 may be translucent so as to cover and provide transmission of light to and from a camera 620 and lights 622, 624. The camera module 310 may further include a connector 604 that may enable connecting wire(s)/cable(s) to provide connection (e.g., input/output, power, etc.) with the controller module 320. In an implementation the connection to the controller module 320 is provided via USB. The camera module 310 may further include a bracket 606 for mounting purposes.

In various implementations, the camera 620 and lights 622, 624 may be positioned and arranged in various suitable ways. In the example implementation of FIG. 6, the camera 620 is positioned in the middle of two rings of LED lights, including an inner ring of lights 624, and an outer ring of lights 622. In various implementations more or fewer lights may be included. In an implementation, lights 622, 624 comprise white 5000k LEDs. In an implementation, lights 622, 624 may provide sufficient illumination to obviate the need for additional external lighting.

In an implementation, the camera module 310 has general dimensions of 126×71×58 mm. In alternative implementations the camera module 310 may have different dimensions. In an implementation, the camera module 310 housing is rated IP67 under IEC standard 60529.

In an implementation, the machine vision device 150 includes a physical switch for turning the lights on or off, and/or adjusting brightness. In an implementation, the machine vision device 150 includes functionality wherein the lights may be operated (on or off, and/or adjusting brightness) via a software interface.

X. Further Example Methods and Functionality

Figure 7:
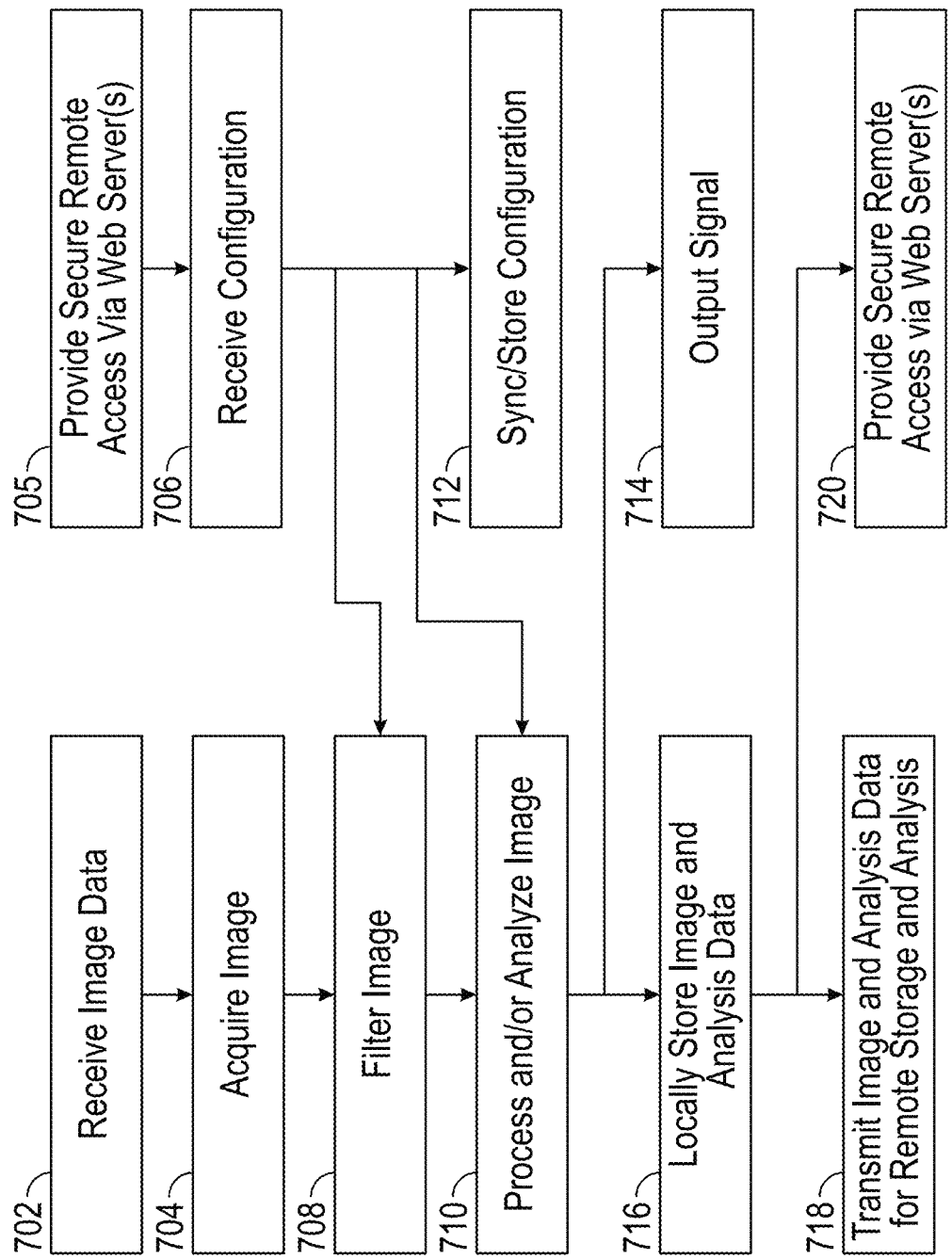
FIGS. 7-8 are flowcharts illustrating example methods and functionality, according to various embodiments of the present disclosure.
Figure 8:
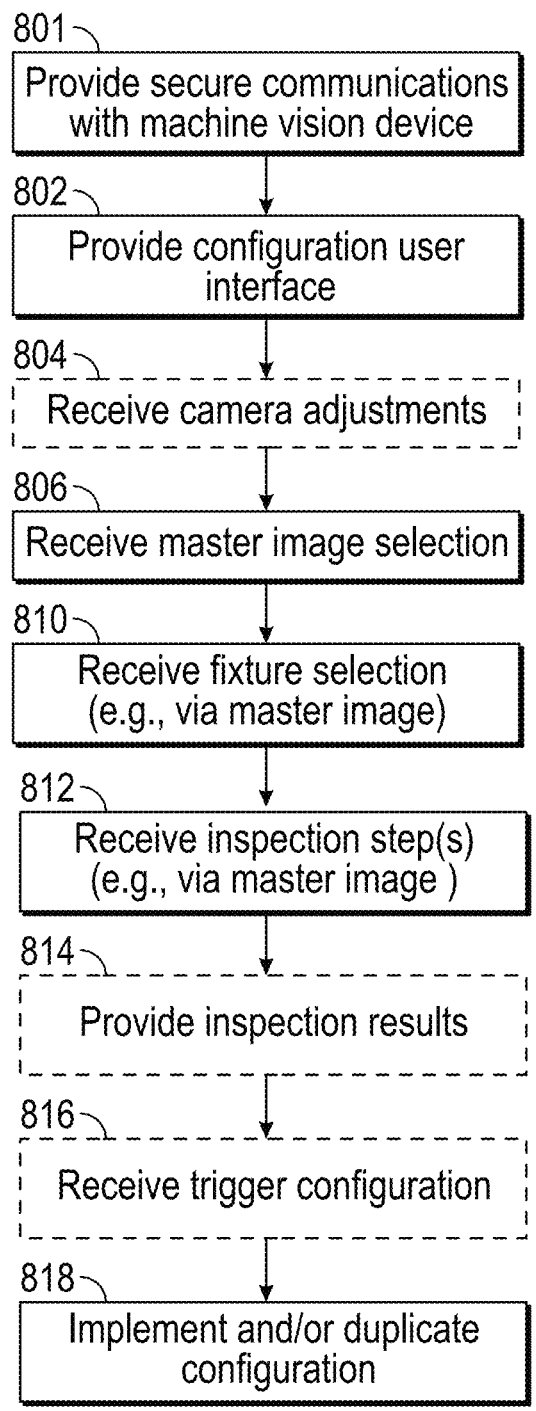

FIGS. 7-8 are flowcharts illustrating example methods and functionality, according to various embodiments of the present disclosure. FIG. 7 is a flowchart illustrating functionality associated primarily with the machine vision device(s) 150. FIG. 8 is a flowchart illustrating functionality associated primarily with the management server 140 for implementing a configuration.

Referring to FIG. 7, at blocks 702 and 704 the controller module 320 receives/acquires image data, as generally described above in reference to blocks 402 and 404 of FIG. 4. At block 708 the controller module 320 filters images, as generally described above in reference to block 408 of FIG. 4. At block 710 the controller module 320 processes/analyzes images, as generally described above in reference to block 410 of FIG. 4 (also broadly and generally referred to herein as determining an "evaluation" of the image(s)). At block 716 the controller module 320 may locally store image and analysis data, as generally described above in reference to block 412 of FIG. 4. At block 714 the controller module 320 may provide output signal(s), as generally described above in reference to block 414 of FIG. 4. At block 718 the controller module 320 may transmit image and analysis data for remote storage and analysis (e.g., at and by management server 140), as generally described above in reference to FIG. 4.

At block 705, the controller module 320 provides secure remote access, e.g., via a web server executing on the controller module 320 (e.g., by web server module(s) 336), to, at block 706, receive a configuration of the machine vision device 150. The configuration provides information to the controller module 320 regarding image filtering and processing/analysis, and may further provide other information regarding image acquisition, local and remote storage of image and analysis data, and/or the like. Configurations may be received from, e.g., the management server 140, human machine interface device(s) 170, and the user device(s) 120. At block 712, one or more configurations of the machine vision device 150 may be stored by the controller module 320 (e.g., in configuration data 334), and may further be synchronized with the management server 140 and/or the human machine interface device(s) 170. In various implementations, communication of configurations may be accomplished without the use of a web server.

At block 720, the controller module 320 may provide, optionally via a web server, secure remote access to the machine vision device 150 by, e.g., the management server 140, the user device(s) 120, and/or the human machine interface device(s) 170. Via such access a user may, for example, monitor a status of the device, view a live image data stream from the device, configure the device, and/or access images and/or analysis data.

As described herein, in various embodiments alerts may be sent to users based on, e.g., image analysis results and/or counts of, e.g., numbers of "passes", "rejects", and/or "no reads". The management server 140 may provide such alerts to user device(s) 120. In some embodiments, the alert and/or notification is automatically transmitted to a device operated by the user and/or organization associated with a corresponding trigger. The alert and/or notification can be transmitted at the time that the alert and/or notification is generated or at some determined time after generation of the alert and/or notification. When received by the device, the alert and/or notification can cause the device to display the alert and/or notification via the activation of an application on the device (e.g., a browser, a mobile application, etc.). For example, receipt of the alert and/or notification may automatically activate an application on the device, such as a messaging application (e.g., SMS or MMS messaging application), a standalone application (e.g., productions line monitoring application), or a browser, for example, and display information included in the alert and/or notification. If the device is offline when the alert and/or notification is transmitted, the application may be automatically activated when the device is online such that the alert and/or notification is displayed. As another example, receipt of the alert and/or notification may cause a browser to open and be redirected to a login page generated by the system so that the user can log in to the system and view the alert and/or notification. Alternatively, the alert and/or notification may include a URL of a webpage (or other online information) associated with the alert and/or notification, such that when the device (e.g., a mobile device) receives the alert, a browser (or other application) is automatically activated and the URL included in the alert and/or notification is accessed via the Internet.

Referring to FIG. 8, at block 801, the management server 140 may establish secure communications with the machine vision device 150. In various implementations, ongoing secure communications may or may not be necessary, as portions of the configuration implementation do not require such ongoing communications. At block 802, the management server 140 provides an interactive graphical user interface, which the user may access via user device(s) 120, for example, by which the user may provide a configuration. Example of such interactive graphical user interfaces are provided in reference to FIGS. 11A-11H.

Figure 11A:
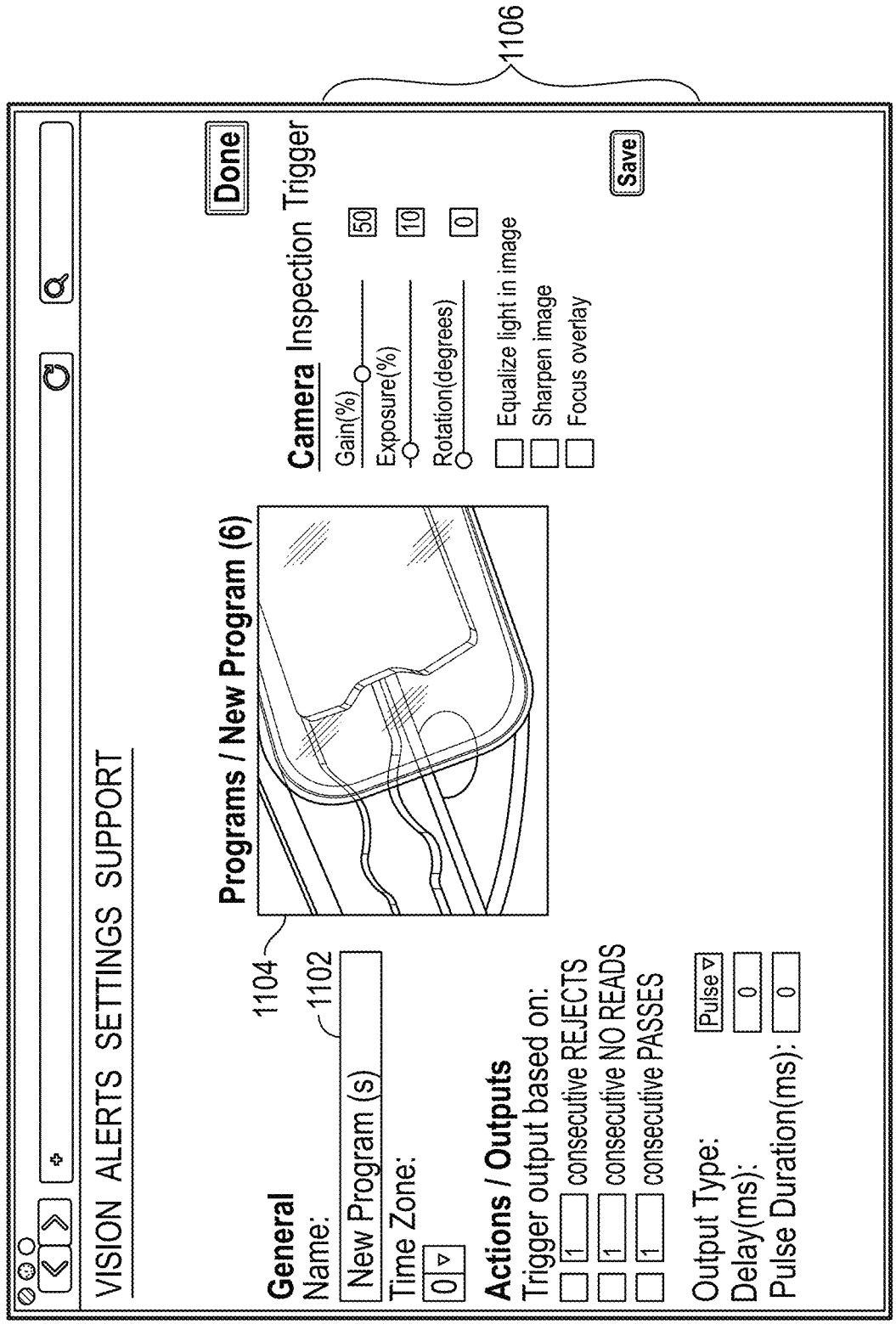

At block 804, the management server 140 optionally receives a user selection of camera adjustments that may affect how the camera(s) obtain image data (see FIG. 11A and the associated description for further examples).

Figure 11B:
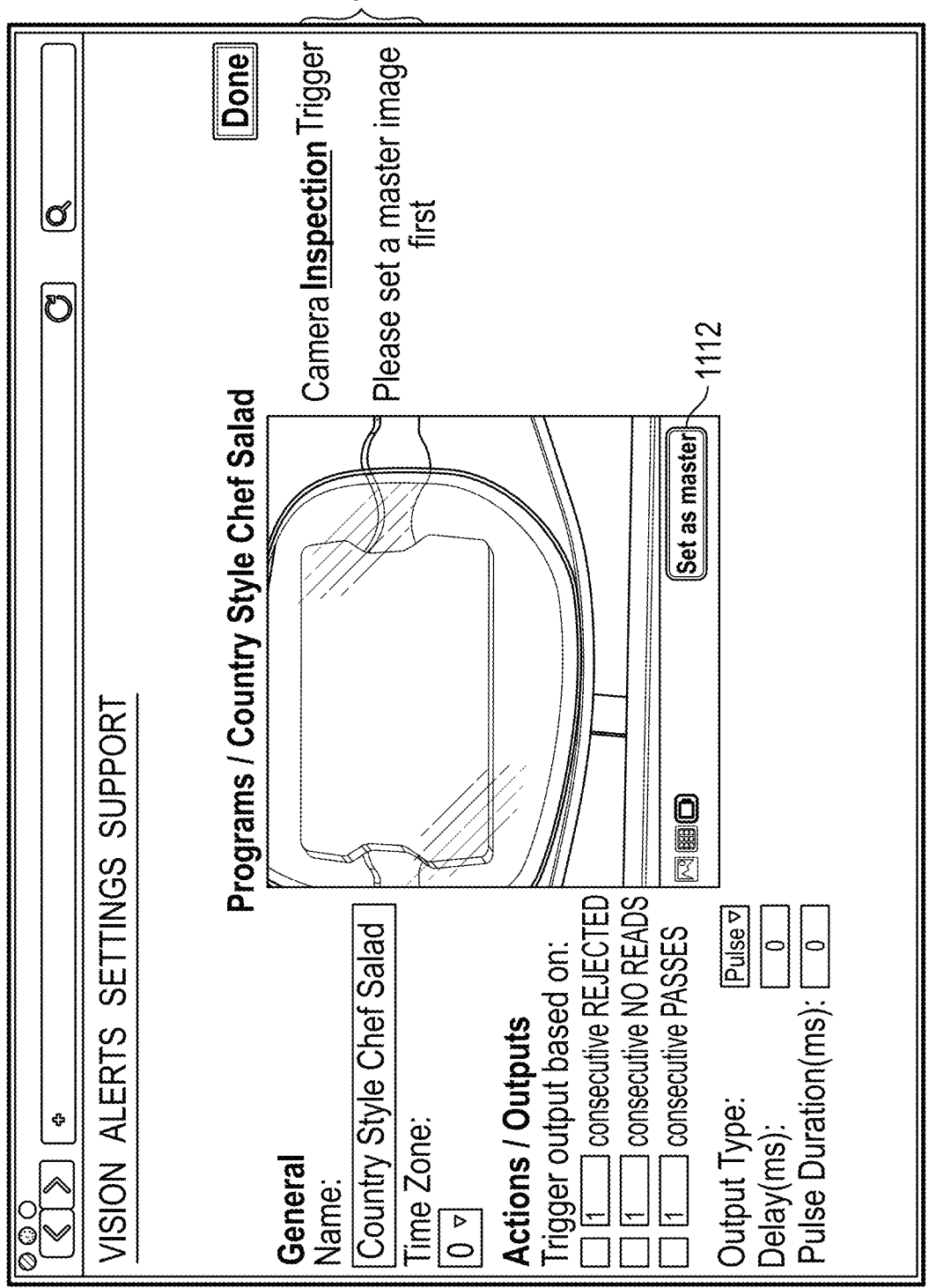

At block 806, the management server 140 receives user inputs selecting an image as a "master image" (e.g., an image based upon which the configuration will be based) (see FIG. 11B and the associated description for further examples).

Figure 11C:
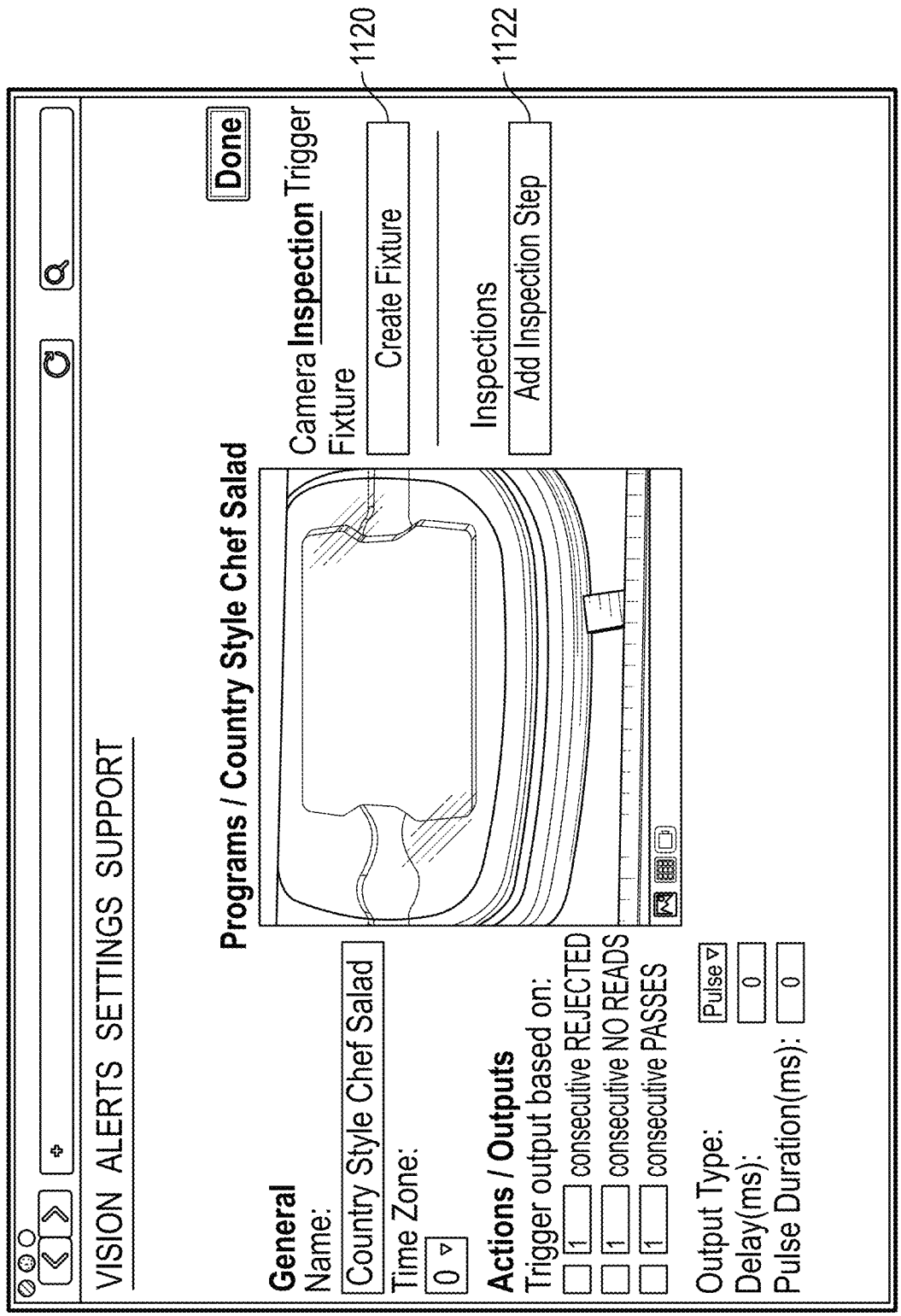
Figure 11D:
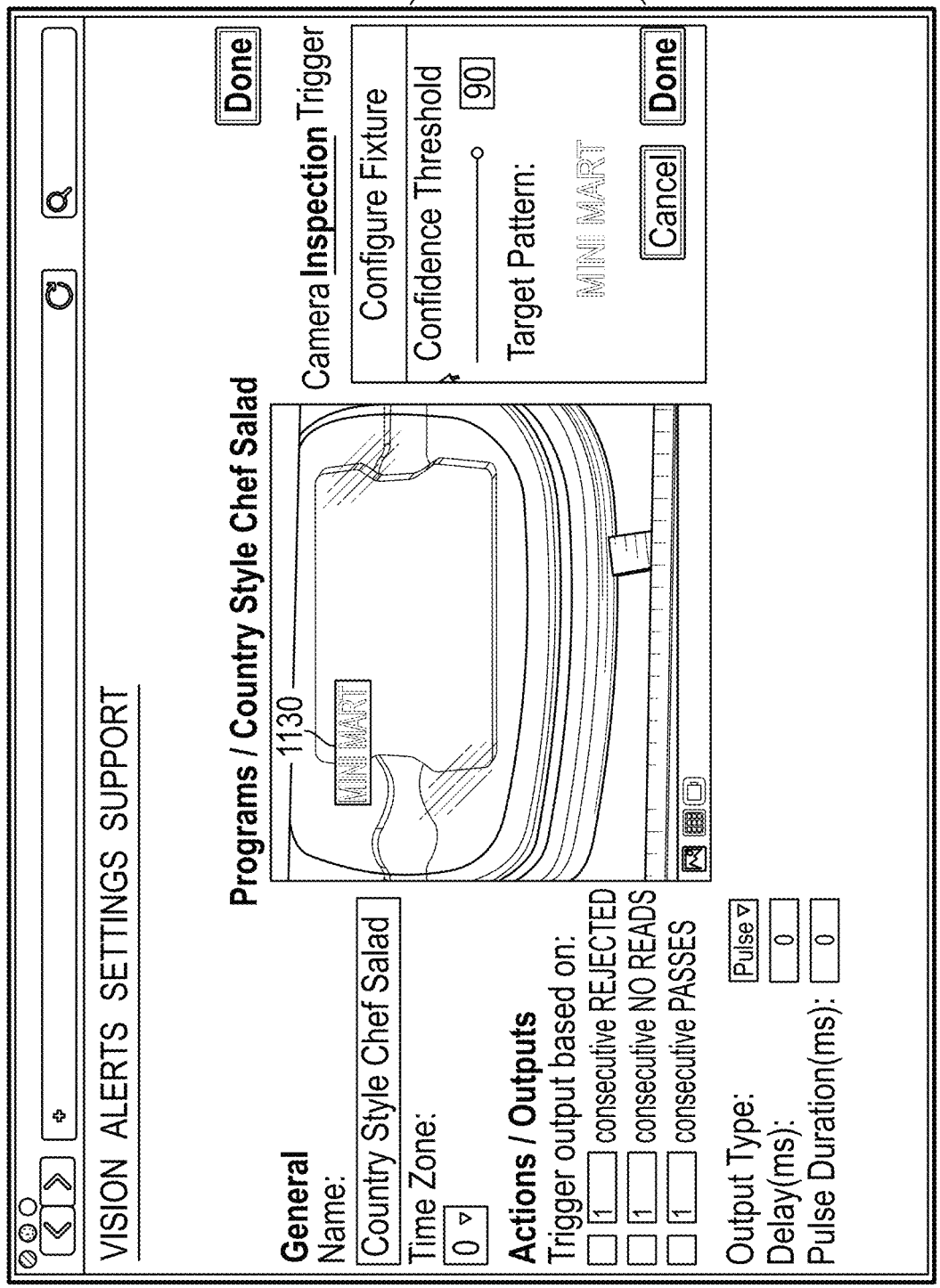

At block 810, the management server 140 receives user inputs defining a "fixture" with respect to the master image (see FIG. 11D and the associated description for further examples). The fixture may comprise a feature that can be detected in the image, which feature provides a reference point for then detecting other features of the image for further analysis. Examples of possible fixtures include symbols, edges, blobs, words, barcodes, and/or any other features as described herein. In some implementations, block 810 is optional and a fixture is not defined.

Figure 11E:
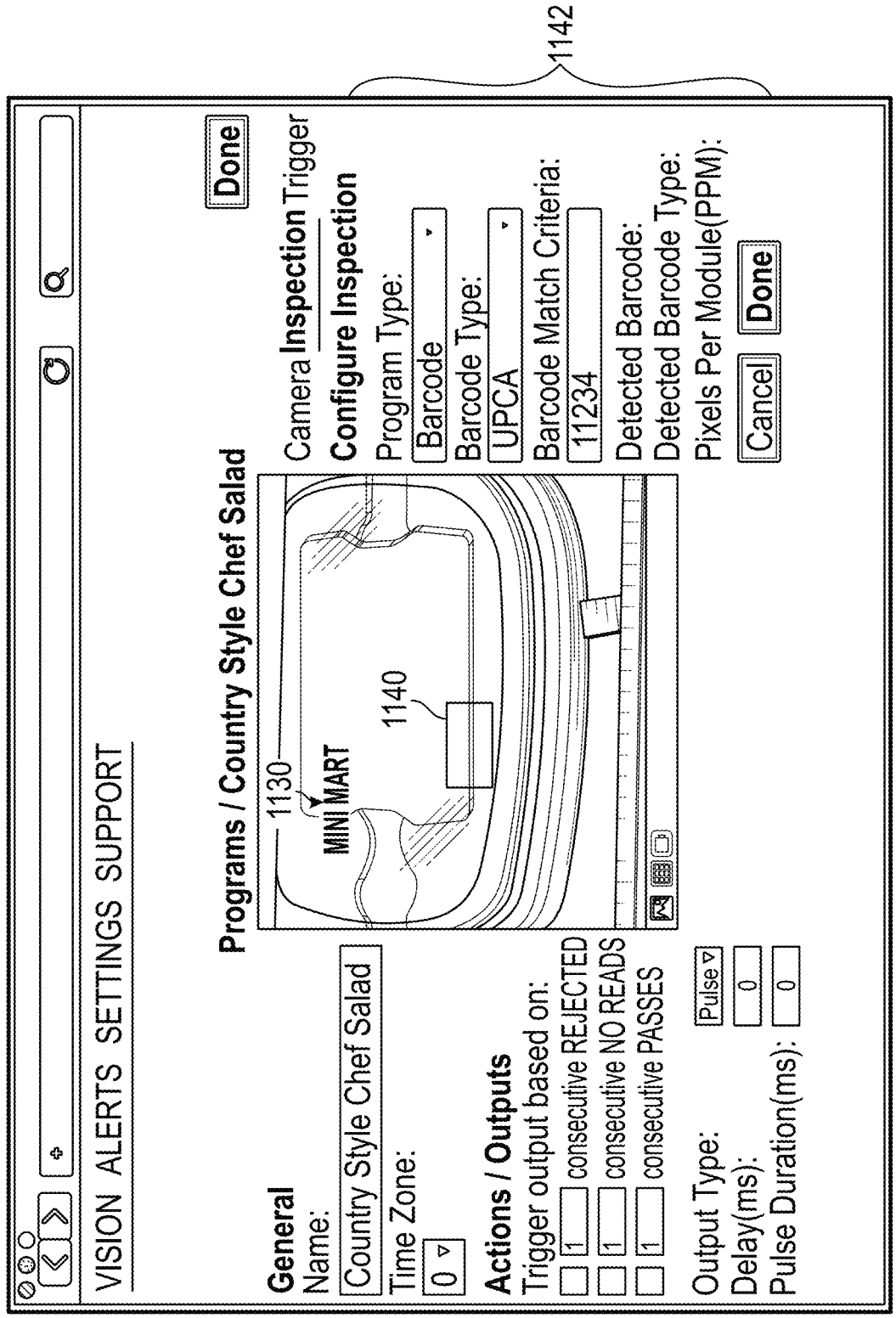

At block 812, the management server 140 receives user inputs defining one or more inspection steps, which may include identification of additional features of the image for analysis (see FIG. 11E and the associated description for further examples). The inspection steps may comprise other features that can be detected in the image, which features may be spatially located in the image relative to the fixture (or relative to one another, boundaries of the images, and/or the like, in various implementations). Examples of possible inspection steps include detection of words, barcodes, dates, and/or any other features as described herein.

Figure 11G:
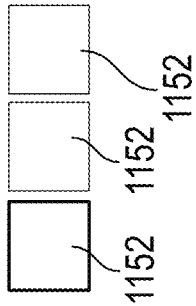

At block 814, the management server 140 optionally runs the configuration (including the camera adjustments, master image selection and associated fixture and inspection steps, etc.) on further images obtained by the machine vision device 150, and provide inspection results for review by the user (e.g., to enable the user to immediately and rapidly see the effectiveness of the configuration) (see FIGS. 11F-11G and the associated description for further examples).

At block 816, the management server 140 optionally receives user inputs configuring output "triggers", e.g., events that are to cause sending of alerts and/or outputs by the controller module 320 (e.g., as described in reference to block 414 of FIG. 4 to, e.g., stop a manufacturing line, etc.). (See FIG. 11H and the associated description for further examples related to trigger configuration.)

At block 818, the management server 140 implements and/or duplicates the configuration. For example, the management server 140 may write the configuration to one or more machine vision devices 150 via wireless communication with the machine vision devices 150. Advantageously, the management server 140 may enable users to centrally access, copy, duplicate, modify, etc. configurations for multiple machine vision devices 150, making updating one or multiple machine vision devices 150 rapid and efficient.

Further description related to providing/implementing configurations, and interactive graphical user interfaces related thereto, are described, e.g., in reference to FIGS. 11A-11H.

XI. Example Graphical User Interfaces

Figure 9A:
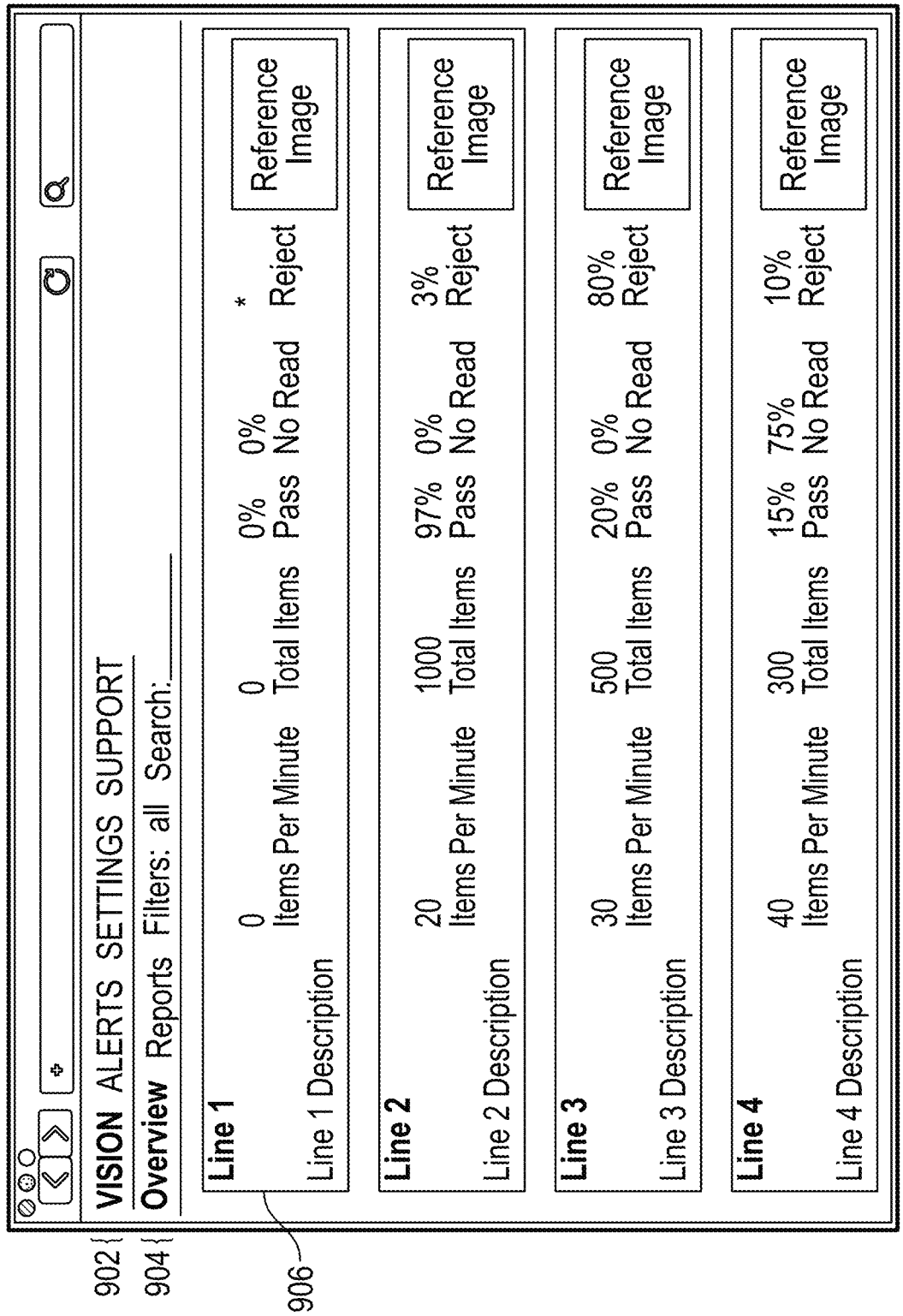
FIGS. 9A-9C illustrate example interactive graphical user interfaces related to analysis of data from machine vision devices, according to various embodiments of the present disclosure.
Figure 9B:
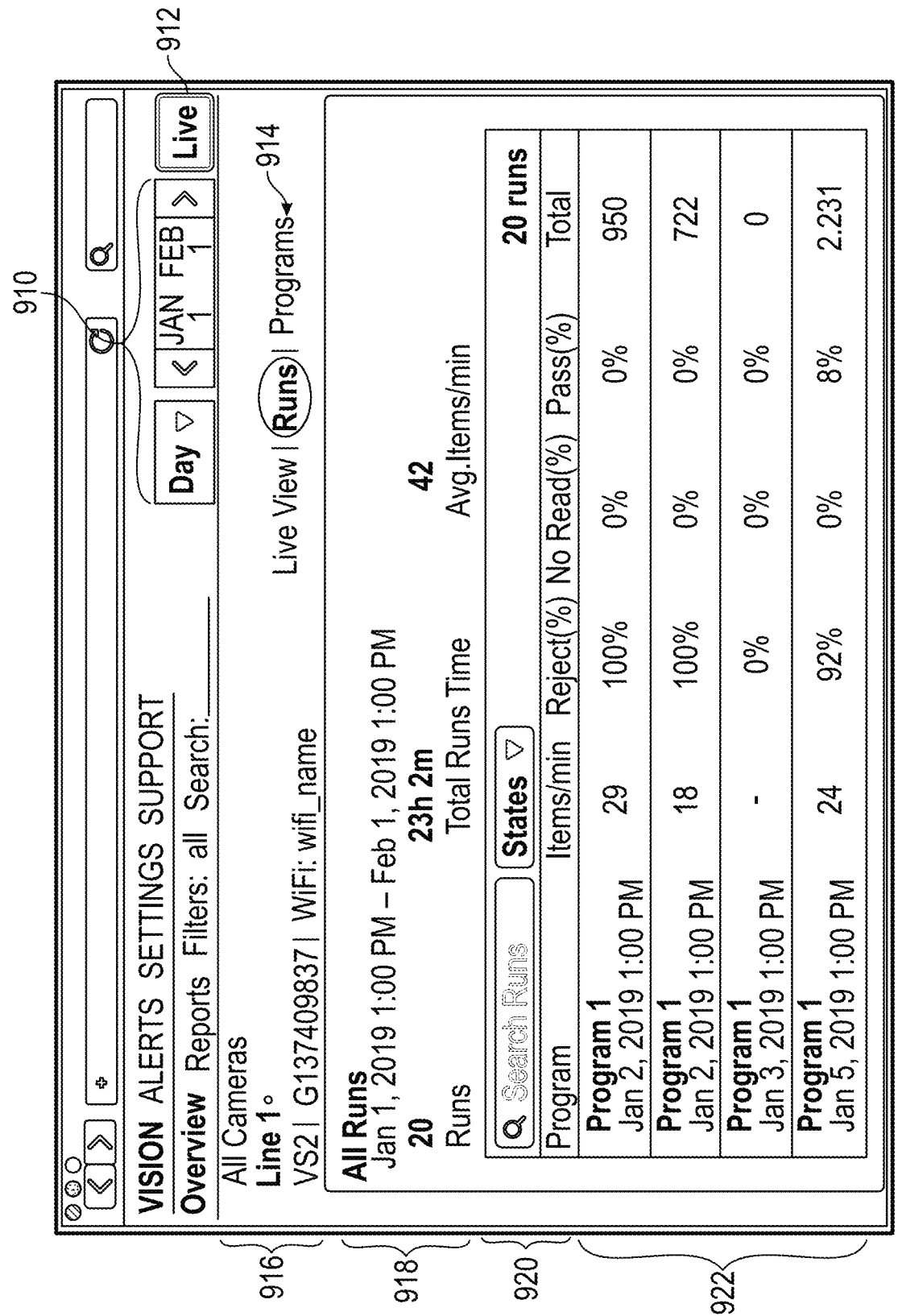
Figure 9C:
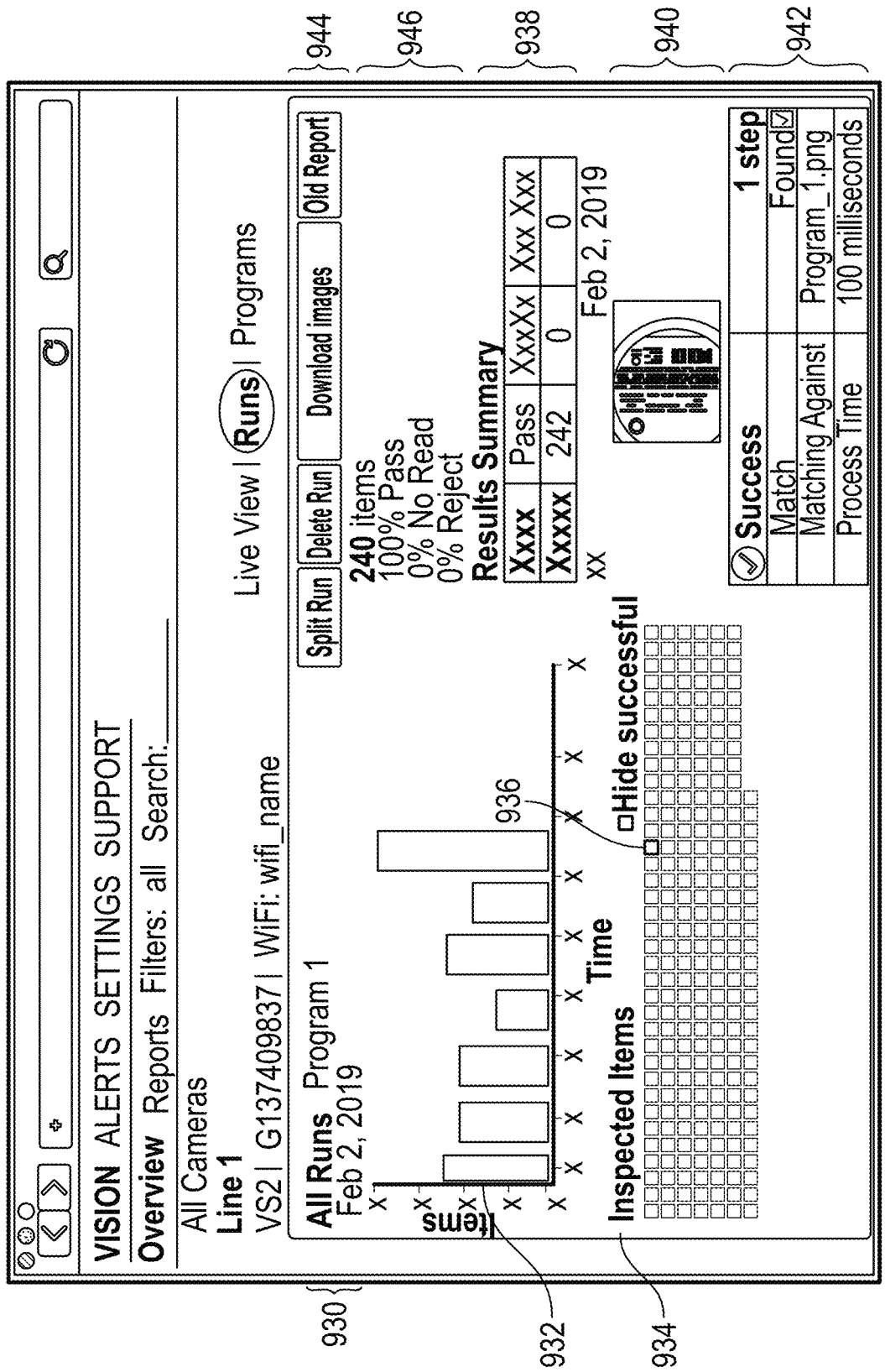

FIGS. 9A-9C illustrate example interactive graphical user interfaces related to analysis of data from machine vision devices, according to various embodiments of the present disclosure. The interactive graphical user interfaces of FIGS. 9A-9C may be provided by the management server 140, and may be accessible via user device(s) 120. In general, images and analysis data are automatically gathered from multiple machine vision devices 150 by the management server 140 (as described herein), and the images and analysis data may then be further aggregated and analyzed to provide information and insights as described. Typically, the graphical user interfaces provided by the management server 140 are specific to an organization, and may include information from multiple machine vision devices 150 associated with the organization.

FIG. 9A includes selectable options 902 and 904 for accessing various pages, user interfaces, and aspects of the interactive graphical user interfaces provided by management server 140. FIG. 9A further includes a list of "lines" 906, each of which represents a respective group of one or more machine vision device(s) 150 that are related to a same, e.g., manufacturing line. In various implementations, machine vision device(s) 150 may be grouped in different ways. Aggregated information related to each of the groups of machine vision device(s) 150 are shown in the graphical user interface of FIG. 9A, including, for example, line names, descriptions, speeds (e.g., average items per minute), total items/images analyzed, percent passed, percent not read, percent rejected, and a reference image (which may include, e.g., a master image, or some other image obtained by a machine vision device 150 on the line). Accordingly, the user may rapidly obtain an overview of the status of many machine vision device(s) 150 simultaneously. Further aggregated information that may be provided in interactive graphical user interfaces of the management server 140 may include various analytics, for example, indications of frequent or likely causes of rejections, average response times of operators when particular failures or events occur, predictions of where problems are likely to arise during manufacturing runs, etc.

FIG. 9B includes a view of a particular line that, e.g., the user may select via interaction with the graphical user interface of FIG. 9A. As shown in FIG. 9B, detailed related to the line/group are shown at 916. At 910 the user can select a particular date range of interest, and may select how the data associated with the line should be aggregated (e.g., day, week, month, etc.). At 912 the user may determine whether the displayed data is live data, and may select to view live, constantly updated data being received from the related machine vision device(s) 150. At 918 the user can view aggregated information related to all runs associated with the line and the selected time range. At 920, the user can select to search for specific "runs", e.g., runs of a manufacturing line, or a particular configuration on a manufacturing line. At 922, the user can view aggregated information broken down by "run". Via selector 914, the user can select to view a "live view" related to the line (e.g., the user may access a livestream or live images and analysis data/results from machine vision device(s) 150 associated with the line), runs data associated with the line (e.g., as shown in FIG. 9B), or programs (e.g., configurations) associated with the line.

FIG. 9C includes a further view of the particular line. In particular, user interface includes an indication of the data presented at 930. At 932 a time-based chart indicates statistics related to various runs of the line. At 934 a diagram of blocks indicates, for each individual inspected item for the displayed data set, a result of the analysis of the item (e.g., pass, reject, or no read) by shading or coloring. The user may interactively select particular ones of the displayed block (e.g., as selected at 936), and thereby cause the user interface to display specific information related to the selected block. For example, at 940 and 942 the image and analysis data associated with the item represented by block 936 are displayed. At blocks 946 and 938 additional information related to the line is displayed. Further, at 944 the user may manipulate the data, including splitting the data associated with the run, deleting the data, downloading images, etc.

Figure 10:
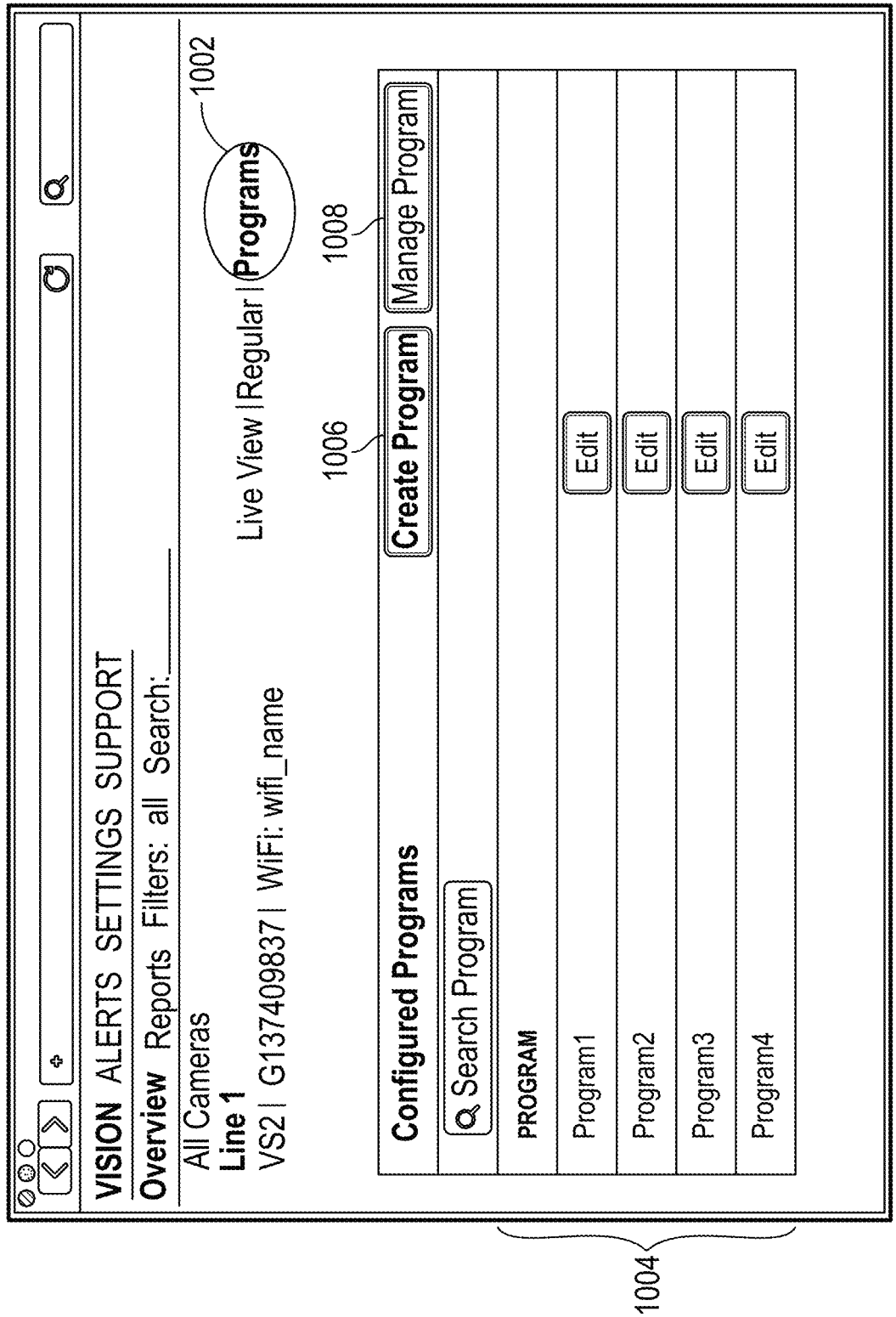
FIG. 10 illustrates an example interactive graphical user interface related to machine vision device configuration, according to various embodiments of the present disclosure.

FIG. 10 illustrates an example interactive graphical user interface related to machine vision device configuration, according to various embodiments of the present disclosure. The interactive graphical user interface of FIG. 10 may be provided by the management server 140, and may be accessible via user device(s) 120. As indicated at 1002, the user may select "Programs" to review programs related to the selected line and related machine vision device(s) 150. In the context of the figures, the term "program" is generally synonymous with the term "configuration" as used within the present disclosure, and relates to configuration of the machine vision device(s) 150. Various configurations related to the selected devices are shown at 1004. The user may optionally edit those existing configurations, and/or may select, via button 1006, to create a new configuration. The user may also select button 1008 to access and potentially modify a configuration on an actual machine vision device 150 directly from the shown graphical user interface. This may be accomplished, for example, by communicating with a web server on the machine vision device 150 of interest, and accessing user interfaces provided by the machine vision device 150 to modify a configuration directly on the machine vision device 150.

FIGS. 11A-11H illustrate example interactive graphical user interfaces related to machine vision device configuration, according to various embodiments of the present disclosure. The interactive graphical user interfaces of FIGS. 11A-11H may be provided by the management server 140, and may be accessible via user device(s) 120, however as described certain information in the user interfaces may also be obtained from a machine vision device 150 via communication with the management server 140. The example interactive graphical user interfaces of FIGS. 11A-11H include examples related to the flowchart of FIG. 8 described above.

Referring to FIG. 11A, via text box 1102 the user may name the configuration, and via image box 1104, the user may cause a machine vision device 150 to obtain an image (e.g., directly from the manufacturing line) for setting up the configuration. In section 1106, the user may provide one or more camera adjustments, which adjustment may be reflected in real-time in the image 1104, or upon the refreshing of image 1104 by acquiring a new image via the machine vision device 150.

Referring to FIG. 11B, the user may select the "inspection" tab in section 1110, and may select a particular image as a "master" image via button 1112. Referring to FIG. 11C, the user may then select button 1120 to create a "fixture", and may select button 1122 to add one or more inspection steps. (In some implementations, the user need not specify a fixture.) Referring to FIG. 11D, the user can create a fixture by creating a selection box 1130 directly on the master image on a portion of the image of interest. The management server 140 then automatically detects features within the selection box, and displays them in the master image and in the section 1132 of the graphical user interface. In the example of FIG. 11D, the selected features include an outline of the words "MINI MART", but any features could be detected by the management server 140. Via the confidence threshold slider in section 1132, the user can adjust the threshold of feature detection within the selection box 1130.

Referring to FIG. 11E, the user can add an inspection step, which in the example of FIG. 11E comprises detection of a barcode within the location indicated by selection box 1140. In particular, the user, via the interactive graphical user interface and selection directly on the master image, can create a selection box 1140 at a spatial location in the master image that is relative to the fixture 1130, and then indicate in the section 1142 what types of features are to be detected in the selection box 1140. As described above, various different types of features (e.g., text detection/matching, etc.) may be specified, and multiple inspection steps may be defined as part of a configuration Referring to FIG. 11F, the user may then save/update the configuration, and may then test the configuration by selecting the capture button 1151, and viewing the results in section 1150. In response to selecting the capture button 1151, machine vision device 150 is caused to acquire one or more images, which images are then analyzed according to the configuration just set up, and the results are provided in the user interface. In an implementation, the configuration is executed on the management server 140 after image(s) are provided from the machine vision device 150. In an alternative implementation, the configuration is executed on the machine vision device 150, and the image and analysis results are then provided to the management server 140. Referring to FIG. 11G, multiple images 1152 may be obtains as part of the testing of the configuration, and detailed review of the results of each particular aspect of the configuration (e.g., fixture feature detection, inspection step(s) feature detection, etc.), may be viewed in the section 1154.

Figure 11H:
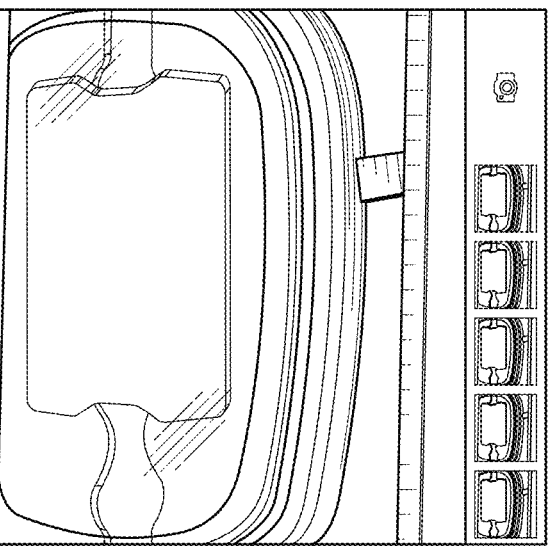

Referring to FIG. 11H, at section 1160 the user may specify, as part of the configuration, a trigger for image acquisition (e.g., trigger 406 described in reference to FIG. 4) which may be periodic, based on a input as described above, and/or the like as described herein. In section 1162, the user may specify output "triggers", which may cause the machine vision device 150 to provide output signals in response to, e.g., detection of a threshold number of "rejects", "no reads", and/or "passes". Additionally, at section 1164 the user may configure aspects of the output that will be provided when the output is triggered.

Upon completing a configuration, the user, via the interactive graphical user interfaces provided centrally by the management server 140, may implement the configuration on one or more machine vision device(s) 150, as described herein.

Figure 12A:
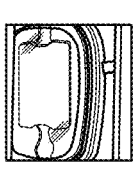
FIG. 12A illustrates an example interactive graphical user interface related to machine vision device configuration, according to various embodiments of the present disclosure.

FIG. 12A illustrates an example interactive graphical user interface related to machine vision device configuration, according to various embodiments of the present disclosure. The interactive graphical user interface of FIG. 12A may be provided by the management server 140, and may be accessible via user device(s) 120. As shown in FIG. 12A, the user may access the results of a configuration execution on a particular machine vision device 150, including individual images and associated analysis data as shown at 1202.

Figure 12B:
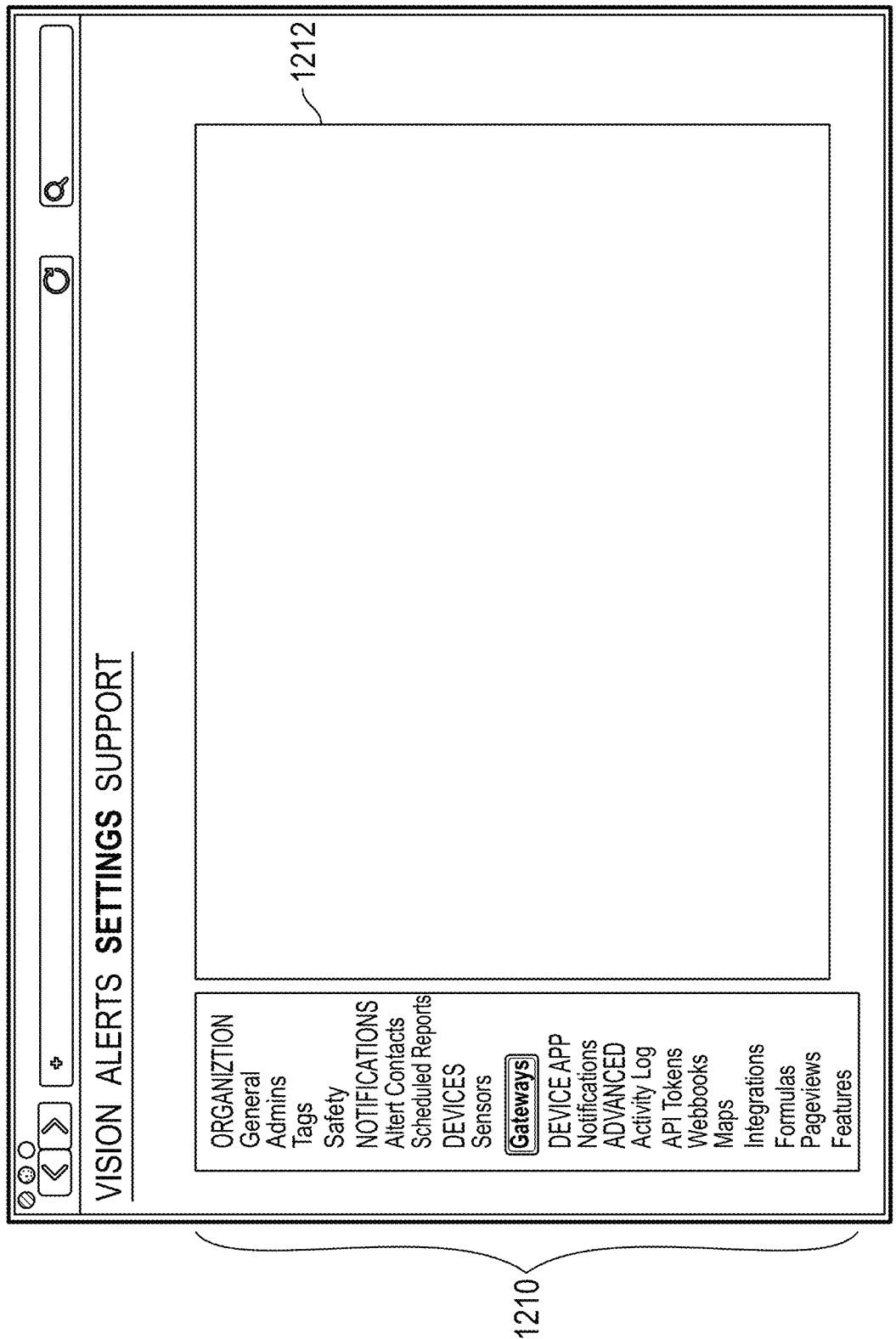
FIG. 12B illustrates an example interactive graphical user interface related to machine vision device settings, according to various embodiments of the present disclosure.

FIG. 12B illustrates an example interactive graphical user interface related to machine vision device settings, according to various embodiments of the present disclosure. The interactive graphical user interface of FIG. 12B may be provided by the management server 140, and may be accessible via user device(s) 120. Via the user interface of FIG. 12B, the user may adjust various settings 1210, including setting up organizations, associating devices (e.g., machine vision device(s) 150) with organizations, organizing devices into groups, setting up alerts/notifications, etc. Detailed options related to selected setting may be displayed in user interface section 1212.

Figure 13A:
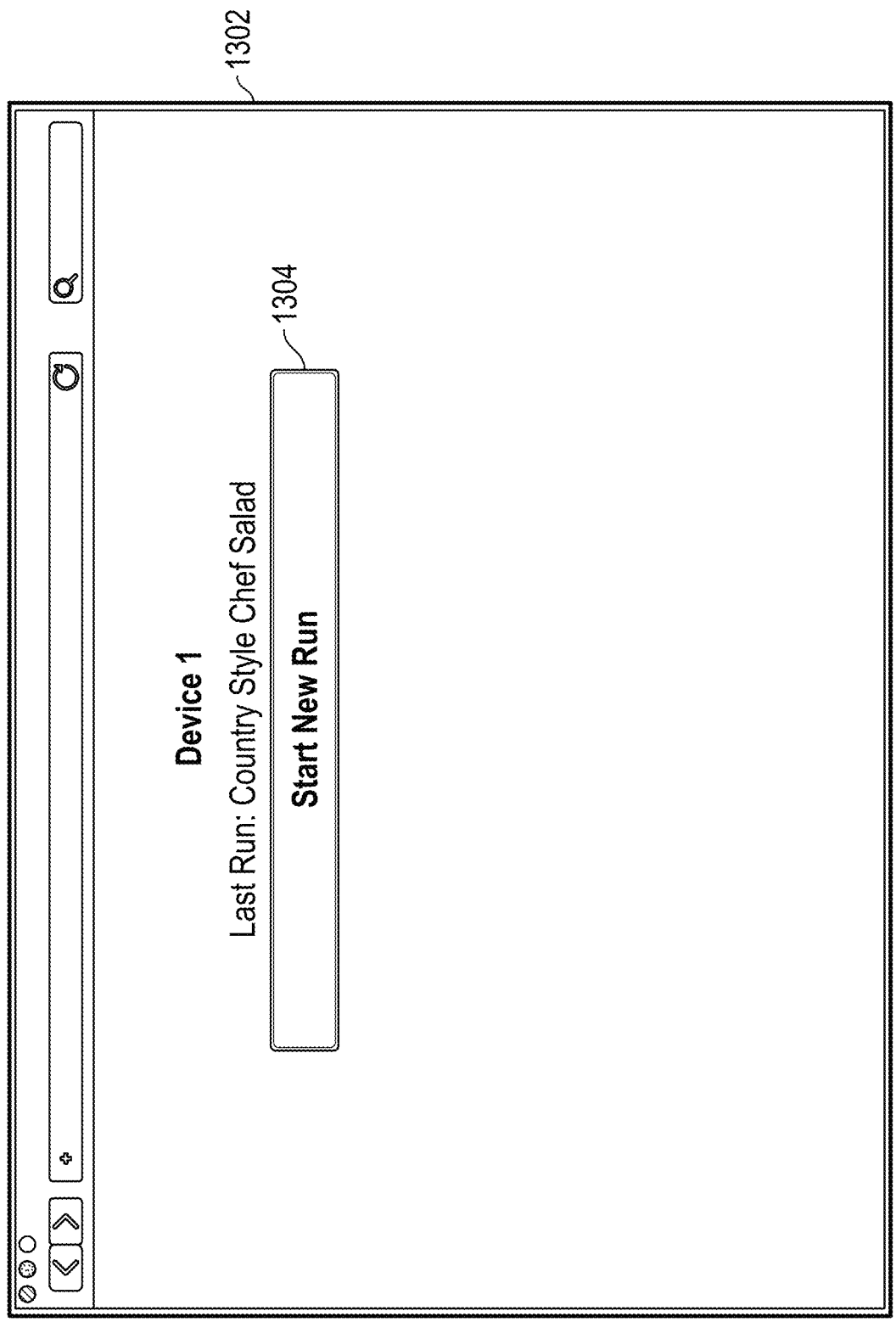
FIGS. 13A-13C illustrate example interactive graphical user interfaces related to human machine interface devices, according to various embodiments of the present disclosure.
Figure 13B:
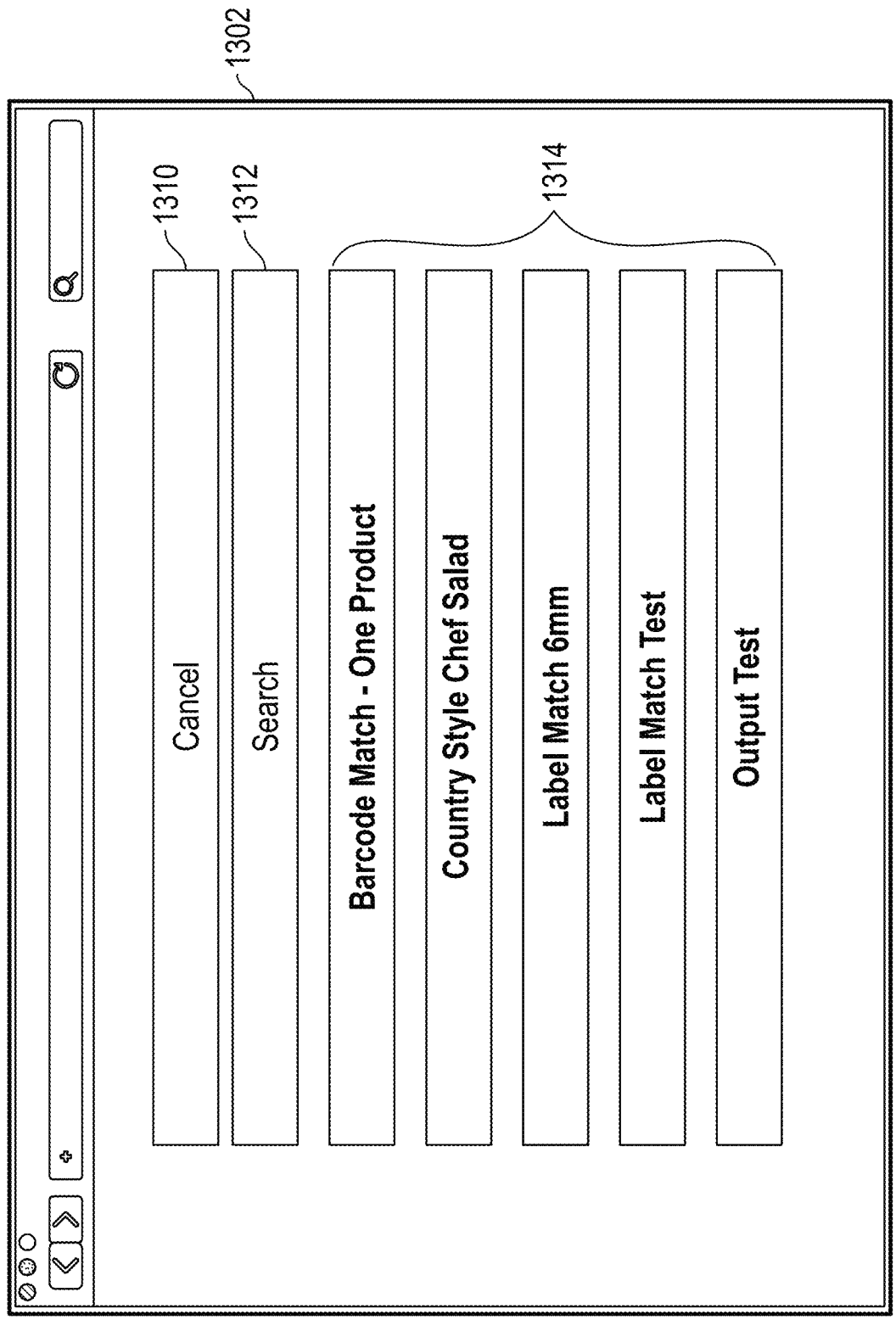
Figure 13C:
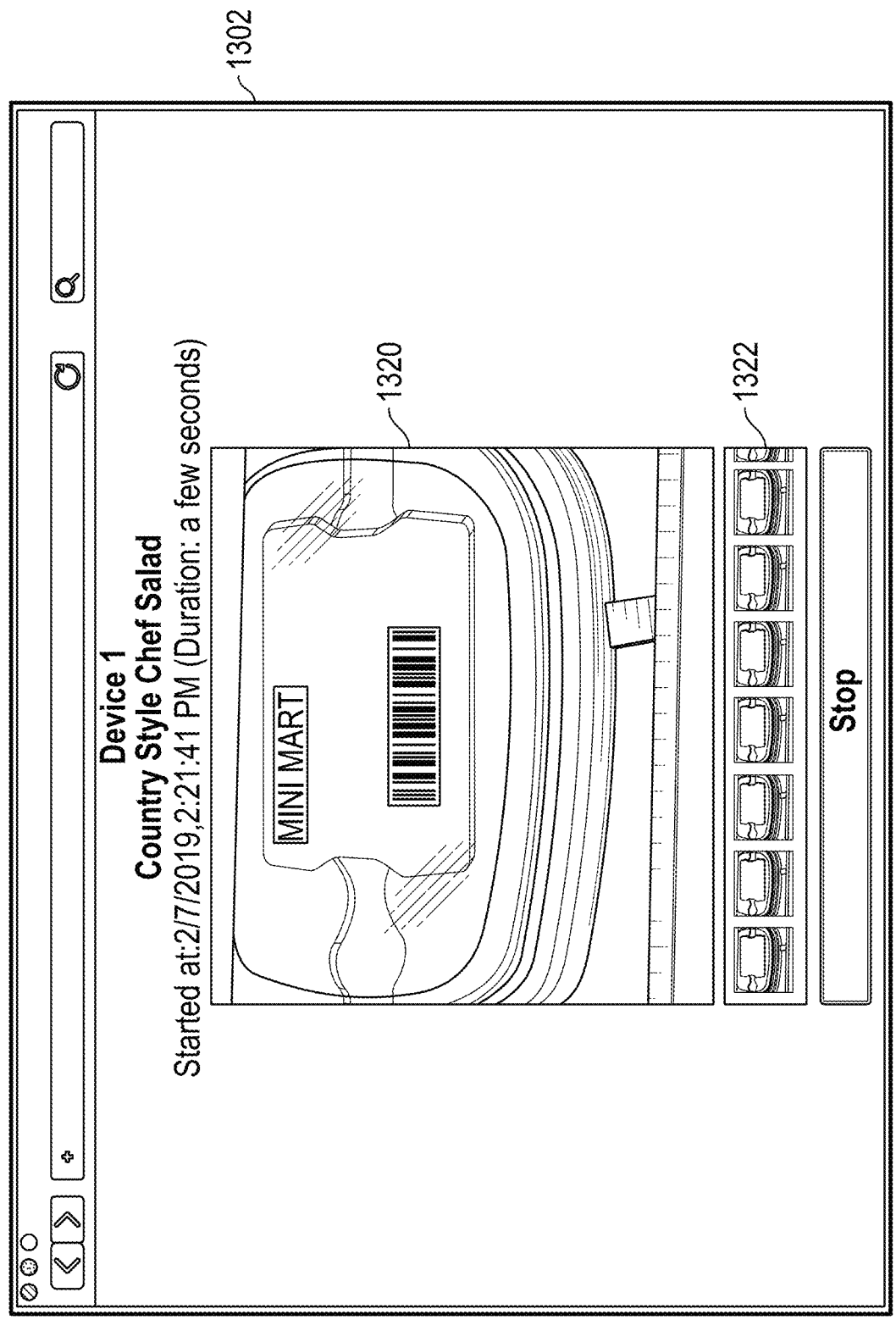

FIGS. 13A-13C illustrate example interactive graphical user interfaces related to human machine interface devices, according to various embodiments of the present disclosure. The interactive graphical user interfaces of FIGS. 13A-13C may be provided by a human machine interface device 170. As described above, the human machine interface device 170 may communicate with one or more machine vision devices 150 via execution of web servers on the machine vision devices 150. Accordingly, user interfaces may be served to, and displayed on, the human machine interface device 170 similar to the user interface 1302.

Referring to FIG. 13A, the interactive graphical user interface may include an identification of the machine vision device 150, and the option 1304 to start a new run of an existing configuration. Referring to FIG. 13B, the interactive graphical user interface may also allow the user to cancel a run 1310, search for a particular configuration 1312 (e.g., a particular configuration stored on the machine vision device 150), or select a particular configuration via buttons 1314.

Referring to FIG. 13C, via the human machine interface device 170 the user may additionally monitor a current status of the machine vision device 150, including a rolling list of images acquired 1322, and via selection of particular ones of the images to view analysis results (e.g., as shown at 1320).

In various implementations, one or more human machine interface device(s) 170 may communicate with one or more machine vision device(s) 150. Thus, a user may simultaneously update multiple machine vision device(s) 150 with various configurations (as may also be accomplished via the management server 140). In various implementations, the human machine interface device(s) 170 (and/or the management server 140) may additionally communicate with additional device(s) 180. Accordingly, via a human machine interface device 170 (and/or the management server 140), the user may, e.g., advantageously initiate configurations of multiple machine vision device(s) 150 and additional device (s) 180, thereby enabling rapid changing and updating of a manufacturing line. Further, as the machine vision device(s) 150 statuses may be provided by the machine vision device (s) 150 themselves (e.g., via the web server module(s) 336), the status displayed by all human machine interface device (s) 170 may advantageously be accurately updated and synchronized.

XII. Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program. In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments may not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computer system comprising:
a computer readable storage medium having program instructions embodied therewith; and
one or more processors configured to execute the program instructions to cause the computer system to:
generate data useable for rendering a graphical user interface;
receive, via the graphical user interface, a selection of at least a first feature and a second feature of a first image;
receive, via the graphical user interface, a selection of a trigger;
determine configuration data based at least in part on the first feature and the trigger; and
provide the configuration data to a machine vision system for execution by the machine vision system.

2. The computer system of claim 1, wherein the first image is received from the machine vision system, and wherein the machine vision system is remote from the computer system and in secure communications with the computer system.

3. The computer system of claim 1, wherein the one or more processors are configured to execute the program instructions to further cause the computer system to:
receive, via the graphical user interface, a selection of a second feature of the first image, wherein the second feature is spatially located relative to the first feature in the first image,
wherein the configuration data is determined further based on the second feature.

4. The computer system of claim 1, wherein the one or more processors are configured to execute the program instructions to further cause the computer system to:
receive, via the graphical user interface, one or more adjustments to be applied to images acquired by the machine vision system.

5. The computer system of claim 4, wherein the one or more processors are configured to execute the program instructions to further cause the computer system to:
receive, via the graphical user interface, a selection of a tolerance threshold associated with the first feature.

6. The computer system of claim 1, wherein the one or more processors are configured to execute the program instructions to further cause the computer system to:
receive, via secure communications and from the machine vision system, one or more additional images;
process the one or more additional images based on the configuration data; and
provide, via the graphical user interface, an evaluation of the one or more additional images.

7. The computer system of claim 6, wherein the evaluation comprises an indication of whether or not the first feature was found in each of the one or more additional images.

8. The computer system of claim 1, wherein the trigger comprises an indication of a threshold number of at least one of: images passing evaluation based on the configuration data, images not passing evaluation based on the configuration data, or images not being readable based on the configuration data.

9. The computer system of claim 1, wherein the one or more processors are configured to execute the program instructions to further cause the computer system to:
receive, via secure communications and from the machine vision system, a live feed of image data acquired by the machine vision system; and
display, in the graphical user interface, the live feed of image data.

10. The computer system of claim 1, wherein the one or more processors are configured to execute the program instructions to further cause the computer system to:
access, from a data store separate from the machine vision system, one or more images and associated analysis data provided by the machine vision system;
generate aggregate information based at least in part on: the one or more images and associated analysis data, and identifiers and/or configurations associated with the one or more images and associated analysis data; and
provide, via the graphical user interface, the aggregate information, wherein the aggregate information is partitioned based at least in part on the identifiers and/or configurations associated with the one or more images and associated analysis data.

11. A computer-implemented method comprising:
by one or more processors executing program instructions:
generating data useable for rendering a graphical user interface;
receiving, via the graphical user interface, a selection of at least a first feature and a second feature of a first image;
receiving, via the graphical user interface, a selection of a trigger;
determining configuration data based at least in part on the first feature and the trigger; and
providing the configuration data to a machine vision system for execution by the machine vision system.

12. The computer-implemented method of claim 11, wherein the first image is received from the machine vision system.

13. The computer-implemented method of claim 11 further comprising:
by the one or more processors executing program instructions:
receiving, via the graphical user interface, a selection of a second feature of the first image, wherein the second feature is spatially located relative to the first feature in the first image,
wherein the configuration data is determined further based on the second feature.

14. The computer-implemented method of claim 11 further comprising:
by the one or more processors executing program instructions:
receiving, via the graphical user interface, one or more adjustments to be applied to images acquired by the machine vision system.

15. The computer-implemented method of claim 14 further comprising:
by the one or more processors executing program instructions:
receiving, via the graphical user interface, a selection of a tolerance threshold associated with the first feature.

16. The computer-implemented method of claim 11 further comprising:
by the one or more processors executing program instructions:
receiving, via secure communications and from the machine vision system, one or more additional images;
processing the one or more additional images based on the configuration data; and
providing, via the graphical user interface, an evaluation of the one or more additional images.

17. The computer-implemented method of claim 16, wherein the evaluation comprises an indication of whether or not the first feature was found in each of the one or more additional images.

18. The computer-implemented method of claim 11, wherein the trigger comprises an indication of a threshold number of at least one of: images passing evaluation based on the configuration data, images not passing evaluation based on the configuration data, or images not being readable based on the configuration data.

19. The computer-implemented method of claim 11 further comprising:
by the one or more processors executing program instructions:
receiving, via secure communications and from the machine vision system, a live feed of image data acquired by the machine vision system; and
displaying, in the graphical user interface, the live feed of image data.

20. The computer-implemented method of claim 11 further comprising:
by the one or more processors executing program instructions:
accessing, from a data store separate from the machine vision system, one or more images and associated analysis data provided by the machine vision system;
generating aggregate information based at least in part on: the one or more images and associated analysis data, and identifiers and/or configurations associated with the one or more images and associated analysis data; and
providing, via the graphical user interface, the aggregate information, wherein the aggregate information is partitioned based at least in part on the identifiers and/or configurations associated with the one or more images and associated analysis data.

* * * * *